(12) United States Patent
Jones et al.

(10) Patent No.: US 10,538,638 B2
(45) Date of Patent: Jan. 21, 2020

(54) PREPREGS FOR MANUFACTURING COMPOSITE MATERIALS

(75) Inventors: Daniel Thomas Jones, Isle of Wight (GB); Barrie Hayes, Cambridge (GB)

(73) Assignee: Gurit (UK) Ltd., Newport, Isle of Wight (GB)

(*) Notice: Subject to any disclaimer, the term of this patent is extended or adjusted under 35 U.S.C. 154(b) by 860 days.

(21) Appl. No.: 13/515,703

(22) PCT Filed: Dec. 10, 2010

(86) PCT No.: PCT/EP2010/069425
§ 371 (c)(1),
(2), (4) Date: Jul. 5, 2012

(87) PCT Pub. No.: WO2011/073111
PCT Pub. Date: Jun. 23, 2011

(65) Prior Publication Data
US 2012/0261060 A1    Oct. 18, 2012

(30) Foreign Application Priority Data

Dec. 14, 2009   (GB) .................................. 0921802.5

(51) Int. Cl.
    *C08L 63/10*    (2006.01)
    *B32B 37/12*    (2006.01)
    *C08J 5/24*     (2006.01)

(52) U.S. Cl.
    CPC .............. *C08J 5/24* (2013.01); *C08J 2363/10* (2013.01); *C08J 2367/07* (2013.01); *Y10T 156/1002* (2015.01)

(58) Field of Classification Search
CPC .......... C08L 63/10; C08L 63/00; C08L 67/06; B32B 37/12; C08J 5/24; C08J 2367/07;
(Continued)

(56) References Cited

U.S. PATENT DOCUMENTS 3,373,075 A * 3/1968 Fekete .................... C07C 67/26
                                                      156/330
4,252,593 A    2/1981  Green
(Continued)

FOREIGN PATENT DOCUMENTS

CA        2039840 A1    10/1991
CN      101128512 A    2/2008
(Continued)

OTHER PUBLICATIONS

First Office Action in corresponding Chinese Patent Application No. 201080062145.4 dated May 22, 2014 with English translation.
(Continued)

*Primary Examiner* — Camie S Thompson
(74) *Attorney, Agent, or Firm* — Polsinelli, PC

(57) ABSTRACT

A prepreg comprising a fibrous material contacting a polymerizable resin, at least 50 wt % of the polymerizable resin comprising at least one polymerizable monomer having at least two carbon-carbon unsaturated functional groups, the monomer being polymerizable by reaction of the unsaturated functional groups to form a cured resin, wherein the resin has a heat of polymerization of less than 230 KJ/kg to provide a maximum increase in temperature of the prepreg of 60° C. during polymerization under adiabatic conditions.

33 Claims, 6 Drawing Sheets

Adiabatic Temperautre Rise in Standard Resin Weight Glass and Carbon Composite Laminates

(58) Field of Classification Search
CPC ... C08J 2367/00; C08F 220/00; C08F 236/00; C08F 220/28; C08F 283/00; Y10T 156/1002
USPC .............. 523/400; 428/297.4, 299.1, 299.7; 525/531, 922
See application file for complete search history.

(56) References Cited

U.S. PATENT DOCUMENTS

| | | | |
|---|---|---|---|
| 4,414,367 A * | 11/1983 | Gardner | C08F 299/0485 525/531 |
| 4,776,992 A | 10/1988 | Irving et al. | |
| 4,824,919 A | 4/1989 | Baker et al. | |
| 4,954,304 A | 9/1990 | Ohtake et al. | |
| 5,165,989 A | 11/1992 | Bhatnagar et al. | |
| 5,196,457 A | 3/1993 | Wilkinson et al. | |
| 6,207,726 B1 | 3/2001 | Ohtani et al. | |
| 6,329,442 B1 | 12/2001 | Sugita et al. | |
| 6,436,856 B1 | 8/2002 | Chtourou | |
| 7,364,672 B2 | 4/2008 | Koes et al. | |
| 2005/0095370 A1 * | 5/2005 | Ellis | C09J 4/00 427/516 |
| 2006/0015039 A1 | 1/2006 | Cassidy et al. | |
| 2006/0154039 A1 * | 7/2006 | Suzuki et al. | 428/292.1 |
| 2009/0131622 A1 | 5/2009 | Ichinose et al. | |

FOREIGN PATENT DOCUMENTS

| | | | |
|---|---|---|---|
| EP | 0075958 A2 | | 4/1983 |
| EP | 0 214 930 A2 | | 3/1987 |
| EP | 0412588 A2 | | 2/1991 |
| EP | WO02/077059 | * | 10/2002 |
| EP | 1829 909 A1 | | 9/2007 |
| FR | 2682380 A1 | | 4/1993 |
| JP | 59138444 A | | 8/1984 |
| JP | S 59-138444 | * | 8/1984 |
| JP | 63030537 A | | 7/1991 |
| JP | 4230466 B2 | | 9/2006 |
| JP | 2006232903 A | | 9/2006 |
| JP | 2006323903 A | | 11/2006 |
| WO | 02077059 A1 | | 10/2002 |
| WO | 2002077059 A1 | | 10/2002 |
| WO | WO 02/077059 A1 | | 10/2002 |
| WO | 2011/073111 A1 | | 6/2011 |

OTHER PUBLICATIONS

Examination Report under Sections 12 & 13 dated Jan. 15, 2018 in corresponding India Application No. 6102/CHENP/2012.
May 4, 2011 International Search Report and Written Opinion in PCT/EP2010/069425.
Database WPI, Week 200664, Thomas Scientific, London, GB; AN 2006-617505, XP002633464, & JP 2006 232903 A (ARISAWA MFG CO LTD), Sep. 7, 2006 (Sep. 7, 2006); abstract.
Database WPI, Week 200664, Thomas Scientific, London, GB; AN 2006-617505, XP002633465, & JP 2006 232903 A (ARISAWA MFG CO LTD), Sep. 7, 2006 (Sep. 7, 2006); abstract.
GB Search and Examination Report dated Sep. 1, 2010 in corresponding GB0921802.5.
The Chemistry LibreTexts Library, retrieved from Internet on Jan. 18, 2018 from https://chem.libretexts.org/Core/Physical_and_Theoretical_Chemistry/Thermodynamics/State_Functions/Enthalpy/Heat_of_Reaction.
Calculation of Molecular weight for the examples listed in CA 2,039,840 AA published on Oct. 25, 1991.
Method of Calculating Polymer Enthaply.
Differential Scanning Calorimeter experimental report for the resin in example A2 of CA 2,039,840 published on Oct. 25, 1991.
Calculation of heat of polymerization (J/g) (Enthaply) for the examples in CA 2,039,840 published on Oct. 25, 1991 and U.S. Appl. No. 5,165,989 dated Nov. 24, 1992.
"A round robin evaluation of differential scanning calorimetry to measure transition enthalpy and temperatures" by Edward Kolbe et al., Journal of food engineering, vol. 40, issues 1-2, 1999, pp. 95-99.
ISO 11357 Parts 1-7 Plastics—Differential Scanning Calorimetry (DSC).
Experimental report submitted by opponent I (with letter of Aug. 20, 2014 before the oral proceedings) in the opposition procedure against the European patent No. 2 155 474 in the name of Rhodia operations.
CYCOM 4102 data sheet ©2013 Cytec Industries Inc. ASM-9046-EN Rev. May 20, 2014.
Technical report US-Army report BRL-TR-3121 (1990).
"Predicting the Viscosity of Low VOC Vinyl Ester and Fatty Acid-Based Resins" US-army report Arl-Tr-3681, by John J. La Scala, 2005.
"Specific heat capacity measurements using DSC I", Hitachi High-Tech Science Corporation, Application Brief, TA No. 11, Jun. 1981.
Calculation of heat capacity for the examples in CA 2,039,840 published on Oct. 25, 1991.
"Heats of polymerization—a summary of published values and their relation to structure", by Roberts D.E., J. Res. Nat'l. Bur. Stand., 1950, vol. 44, No. 3, p. 221-232.
"Reply to the appeal" issued on Sep. 22, 2015 in the opposition procedure against the European patent No. 2 155 474 in the name of Rhodia operations.
Opposition Against European Patent 2 513 2017 (10790835.2 Statement of Grounds, Facts and Arguments.
Examination Report in corresponding EP Application 17158080.6 dated Nov. 7, 2019.

* cited by examiner

PREPREGS FOR MANUFACTURING COMPOSITE MATERIALS

FIELD OF THE INVENTION

The present invention relates to a prepreg for manufacturing a composite material. The present invention also relates to a method of producing such a prepreg, and to a method of producing a moulded fibre-reinforced composite material using such a prepreg.

BACKGROUND

The term "prepreg" is generally recognised in the art of fibre-reinforced resin composite materials to describe a blend of continuous high strength fibres (e.g. of carbon fibre, glass fibre, or other known fibre materials) combined with a heat hardenable mixture of resins, in particular thermoset resins, and, where required, hardeners. The fibres may originally be present either as woven fabrics or optionally angled directional fibre arrays which have the resin applied to them in a solid or semi-solid state. The degree and nature of the impregnation of resin, and hardener, into the fibres may vary. The resin, and hardener, may selectively be fully impregnated into the fibres; coated onto one side onto the fibres; partially impregnated into the fibres; or sandwiched between opposed dry fibre layers such that the outer surfaces of the prepreg are free of resin, as disclosed in EP-A-1128958. Such prepregs having opposed dry fibre outer surfaces are easy and clean to cut, stack and react to give a low void content and optimum performance for the fibre and resin materials used in them.

Prepregs can be readily distinguished by those skilled in the art from the manufacture of composite materials made directly from continuous fabrics or discontinuous fibres and liquid resins applied by brush, roller, spray or any other similar method to produce low fibre content "wet lay-up" products. These have an important role in composite manufacture but generally have less than optimum properties with lower fibre contents than are necessary for applications needing the highest possible performance. The liquid resin materials are usually undesirably sticky, difficult to control accurately, and because strongly smelling volatile reactive diluents are often used, require continuous high levels of cleanliness and expensive extraction and recovery facilities in the workplace.

Prepregs can also be readily distinguished by those skilled in the art from the SMC (Sheet Moulding Compounds) or DMC (Dough Moulding Compounds) which are rapid processing materials, in sheet or dough like form, using discontinuous or random fibres and large amounts of mineral fillers combined with fast curing resins. These are cured quickly in relatively thin section between metal moulds to make tough, thin walled cases for many applications including electronic equipment and the like. They are very useful materials in the applications they fulfil but cannot be considered in any physical sense optimised structural composites.

Where necessary to prevent adjacent prepreg surfaces from inadvertently adhering to themselves when presented to the customer for use, or to prevent contamination in the workshop, they may be interleaved on one or both sides with a polyethylene film or alternative release materials.

Typically, prepregs may have nearly or exactly the correct amount of resin in them, matched to the respective fibre content. Once air has been removed from a prepreg assembly by the application of a vacuum, the resin flows under the influence of heat and pressure to fill all the spaces between the fibres. After a heat reaction, called the "curing process" for the resin, the prepreg assembly yields a near or completely void free laminate, the desideratum in a composite fibre-reinforced resin laminate.

Where excess resin is present this must be removed by a variety of techniques well understood by composite material processors to yield void free laminates but in general this is to be avoided where possible as it involves ancillary materials, labour and extra cost.

Such high strength composites have become increasingly used in a wide variety of applications in general industry since their debut in aerospace and some sports goods applications in the early 1970s.

As the applications and volumes of prepregs have multiplied, the fibres and resins from which they have been made have been modified to make them easier and cheaper to buy and use to maximise the performance and volume of products that can beneficially made from them.

However, the composite materials industry has now reached a point where further significant improvements to these fibre and/or resin materials needs to be made so that they may be processed more readily, speedily and cheaply to widen the range of items that can benefit from their properties and can be produced from them more economically.

Aerospace structural composite parts are frequently made from prepregs that are based on resins offering high glass transition temperatures (Tgs) to give large margins of safety should they be exposed to high temperatures, or to very high humidity for long periods of time leading to water saturation of the resins and a lowering of these Tgs but still to acceptable levels. Consequently they tend to use foimulations with a high degree of cross linking which results from using resins with a high reactive group content and a consequent very high heat evolution during cure. This heat evolution must be rigorously controlled by careful processing to avoid excessive temperature rise or damage will result to the composite part.

This level of cross linking with aerospace structural prepregs leads to brittleness which is reduced by the incorporation of significant levels of thermally resistant thermoplastics which in itself leads to high melt viscosities and the need then for high processing pressures. The resins and processes employed tend to be very expensive.

For general structural composites, the current state of the art performance prepregs and composite materials made from them, excluding aerospace primary structural parts, largely consist of glass, carbon and aramid fibres in any required combination, usually impregnated with a blend of solid and liquid Bisphenol A epoxy resins of relatively low molecular weight plus a hardener system which only reacts very slowly at room temperatures giving a storage life of several weeks without significant reaction. This hardener is usually a mixture of finely divided dicyandiamide coupled with a latent urea accelerator. These resin combinations will normally give a substantially full cure after reaction at around 120-130° C. for 1 hour or 12 to 16 hours if cured at 90° C.

These resins are used because they give excellent composite mechanical properties for applications requiring temperature resistance up to the region of 120° C. Most applications in general industry rarely need their best performance above 80° C.-90° C. Current applications include wind turbine blades, leisure and commercial marine, automotive body panels, less critical exterior and most interior aerospace applications, sports goods and the like.

Examples of commercially available prepregs which use lower molecular weight bisphenol and similar epoxy resins and have lower cross link densities than the structural aerospace materials, and typically have a thermal resistance of 100° C.-120° C., include those sold by Hexcel Corporation under the product names M9, M9F, M11, M11.5 and those sold by Gurit (UK) Limited under the product names WE90, WE91, and WT93.

If attempts are made to cure these prepregs quickly, that is at a temperature of around 100° C.-120° C., the temperature range at which the hardener become very reactive, large amounts of heat of reaction are generated in a short time. Unless the composite sections being produced are very thin and the moulds on which they are made conduct this heat away quickly then the composites can reach damaging and even decomposition temperatures.

In thick laminates, i.e. typically having a thickness of greater than 10 mm, in particular greater than 20 mm, made from standard epoxy formulations and glass fibres, temperatures as high as 250° C.-300° C. can easily be achieved. These both damage the composite and often the moulds on which they are made if they are non metallic. The majority of high performance moulds are usually made from epoxy composites themselves and it would be a great advantage if cheaper and lower temperature resistant tools could be used formed from; vinyl ester composites, or even better the much cheaper wet lay-up polyesters composites or the CNC machinable epoxy and polyurethane tooling blocks and pastes.

This damaging temperature rise must be prevented and this is usually achieved by heating the prepreg stack to a level where the reaction just begins and holding it at that temperature, possibly for several hours, whilst a large proportion of the total reaction slowly takes place and the resultant heat is continuously conducted away thus limiting the temperature rise. The reaction is finally completed with the standard cure cycle of around one hour at 120° C. This step is essential to ensure consistency in thick sections and full cure in thin sections. This two step cure process is common practice and for the first lower temperature stage is often referred to as an "intermediate dwell".

There are particular practical problems producing large components, such as wind turbine blades, from prepregs. A typical composite laminate usually contains areas of different thickness to meet the strength requirements of a given structure. Foams, wood and honeycomb are also often incorporated to form sandwich structures to lighten the construction by separating the fibre reinforced skins with a lower weight core material.

In order to produce such a mixed thickness laminate the method typically used is first to heat the prepreg lay-up to an intermediate dwell temperature to allow the cure reaction to proceed slowly in the thick sections thus allowing the polymerisation to proceed at a rate where the heat produced in the laminate can both flow towards the mould tool and the opposite vacuum bag face. Heat can then be lost through conduction and then either natural or forced convection. Nevertheless, due to the heat releasing nature of the reaction this still usually results in a tolerable temperature increase above the curing temperature, "the exotherm", in the thicker section during the intermediate dwell but no significant exotherm in the thin sections. Once the exotherm has been controlled in the thicker sections the temperature of the whole lay-up needs to be increased to cure the thin section in a reasonable time.

Without the low temperature intermediate dwell, the rate of heat production would exceed the rate of conduction to the edges of the laminate where it can be lost by normal conduction, convection and radiation. This causes the temperature of the material to rise which in turn leads to a greater rate of reaction producing more heat and a more rapid temperature rise and frequently a large exotherm event. Effectively this may be close to the actual adiabatic temperature rise of which the prepreg is capable. It is not until the reaction rate begins to slow as a significant number of reactive groups have been consumed that the material begins to cool down to the surrounding temperatures.

For example a typical cure for a wind turbine blade using WE90, a DEGBA epoxy prepreg, from Gurit (UK) Limited is likely to have a 1 to 4 hour dwell at 80° C.-90° C. to first control the exotherm, which otherwise might become destructive, followed by a 1 hour further cure at 115-120° C. to ensure full reaction in all areas of the laminate. If the thinner sections of the blade were allowed to remain at 80° C.-90° C. then it would take a further 12 to 16 hours to be certain that full cure had taken place.

Frequently the thickness of the laminates range from 5 to 45 mm for the majority of the blade then increase to 70 mm in some designs to accommodate local bolts or other fixings to attach the turbine blade to the hub assembly. It is clear that heat release must be slow otherwise it would cause an uncontrollable exotherm in the thicker sections.

The design and control of the curing process can become complex. For instance this may need to prevent unwanted exothermic heat flow from the medium thickness areas to the thicker sections, which normally heat up more slowly, triggering early exotherm in them before the reaction has taken place in a controlled manner.

These extended curing cycles are naturally not restricted to wind turbine blades but apply to any thicker section components.

Clearly such cure cycles are both time consuming and severely limit production rates making composites from the current prepregs too expensive for many applications which could benefit from them. Production could be increased by utilising more moulds but these can be very expensive and occupy more factory space resulting in even more cost.

The key factor often limiting the cure speed is the mould tool. For both small volume runs and large parts, such as wind turbines, mould tools tend to be constructed from composite materials. The cost of the tooling materials will increase with the temperature performance. Lower temperature cures are preferred, but are not always possible, as they also help reduce the tool stress and can lead to longer tool life. All such composite tools have a low thermal conductivity and hence exacerbate the exotherm event temperature rise problem.

Typical tooling materials are shown in Table 1.

TABLE 1

Typical Tool Materials

| Temperature Resistance | Type |
|---|---|
| Above 160° C. | Specialist Aerospace Metal Tools |
| Up to 160° C. | High Performance Epoxy |
| Up to 130° C. | Performance Epoxy. |
| Up to 110° C. | High Performance Vinyl Ester. |
| Up to 80° C. | High Performance Polyester. |
| Up to 70° C. | Epoxy modelling pastes, High performance Epoxy tooling blocks |
| Up to 50° C. | Low performance tooling block and modelling pastes |

A hypothetical idealised prepreg would exhibit not all of the following combination of properties:
1. Possess a reasonable storage life to enable manufacture, testing, packing, shipment and customer shop floor use time. Ideally this is around three months at ambient temperatures, but may be as short as one week in certain circumstances. The useable life of all prepregs may be increased by cold storage.
2. Absence of strong smelling or significantly volatile materials during normal storage, handling, cutting, lay-up or curing conditions.
3. No adverse reactions with water or carbon dioxide at any stage of prepreg storage or use.
4. Easy to cut neatly, cleanly and readily to any desired shape by recognised methods.
5. Good drape and tack characteristics for applying into a mould or any other equipment used for forming.
6. Capability of reaction to give the final optimum cured product at a temperature no higher than 130° C. but desirably as low as 60° C. in one hour or less at the cure temperature.
7. Heat of reaction evolution should not permit the total maximum temperature achieved in any thickness composite moulding to exceed 160° C. and most desirably 100° C. or even lower.
8. If the heat of reaction can be reduced significantly the prepreg can be cured more rapidly and possess a "snap cure" characteristic to further reduce the cure time to provide further productivity benefits. In this specification, the term "snap cure" means the curing of a prepreg resin in a period of at most 45 minutes, preferably less than 30 minutes and more preferably less than 15 minutes, after reaching the cure onset temperature.
9. Ability to be cured by ultra violet and/or visible radiation.
10. Cured properties to satisfy the end composite material requirements fully and consistently, ideally matching those of current prepregs to avoid the need to redesign components to accommodate new products.

The usual approach in currently known lower exotherm epoxy prepregs to manufacture thick laminate components is to formulate the opposite of a snap curing material—that is materials are formulated to have a broader heat release curve to try to reduce reactivity closer to the cure onset temperature. This provides a temperature window for the component manufacturer to programme an intermediate dwell within the tolerance capability of their heating system to control the initial heat release by holding at a temperature where the reaction proceeds at a slow enough rate to avoid a damaging out of control exotherm. This approach leads to undesirably long cure cycles.

Most unsaturated resins, such as vinyl or polyester resins cured by latent free radical reaction possess a snap cure characteristic. U.S. Pat. No. 6,436,856B1 discloses such a vinyl ester prepreg. The vinyl ester resin is supplied diluted in styrene monomer to both reduce the overall cost of the composition and the starting viscosity to allow simple machinery to be used to impregnate the fibre reinforcement. The composition also contains magnesium oxide to increase the viscosity of the resin after impregnation from a low viscosity liquid into a prepreg viscosity often referred to as a B-staging process, in the same manner as is used to manufacture polyester and vinyl ester SMC and dough moulding compounds.

Such a resin has a high unsaturation per Kg and is estimated to have a heat of polymerisation of 350-450 KJ/Kg in the examples given in U.S. Pat. No. 6,436,856B1. On reaching the activation temperature of the peroxide catalyst the prepreg begins to cure very quickly and self accelerate leading to a very large exotherm event in a thick laminate.

Inhibitors can be added to absorb the free radicals generated by the latent curing agent but these tend to only delay the onset of the reaction as they work by scavenging the free radicals generated as the curing agent decomposes to produce free radical curing agents. Once the inhibitor has been consumed or simply is ineffective due to the volume of free radical generated at the decomposition temperature, the polymerisation reaction continues at a rapid rate and the heat rise from the polymerisation further self accelerates the generation of free radicals leading to an uncontrollable exotherm event. Providing an excess of inhibitor or lower amounts of free radical initiators also proves ineffective as this can cause the resin to be under cured.

As such the practical use of these prepregs has been limited to the manufacture and rapid cure of thin laminates where the heat can be loss by conduction into the mould tool and radiation and convection from any exposed surfaces.

Latent hardeners can be more easily selected to control the heat release during cure of epoxy resins. For both mechanical performance and processing reasons epoxy resins have to a large extent been the matrix resins of choice for making most high performance composites. It would be highly desirable to have prepregs that have both a long shelf life at room temperature to remove the need for refrigerated storage, and transport. So far this has proved difficult. Typically a 90° C. curing prepreg would have a shelf life of 8 weeks at 20° C. and a low temperature curing 50-60° C. system a shelf life of 1-3 days at 20° C. and these prepregs are transported and stored in temperature controlled and sub-ambient conditions.

The majority of these epoxy systems have been based on the readily available Bisphenol A (4,4' dihydroxyphenyl 2,2 propane) series. This is a homologous series of essentially diglycidyl ethers. They range from the crystalline virtually pure monomer, through flowing liquid resins to semi solids, solids and ultimately to very high molecular weight polymers with almost no epoxy content.

Other epoxy resins based on Bisphenol F (4,4' dihydroxyphenyl methane) and oligomers of this as well as those based on higher molecular weight polyfunctional novolac resins have also been used. Much the same reasoning below applies to these epoxy resins as well.

It is standard practice to blend liquid and low molecular weight solid versions from the range to yield mixtures which are fluid enough at safe temperatures when containing the curing agent to enable good impregnation of fabrics and fibres and casting of films, and flexible and tacky enough as prepregs for good processing at shop temperatures, and with good viscosity control for processing into high quality laminates.

In some cases no tack and low flow are required and then a slightly higher proportion of solid resin will be used.

The following calculations demonstrate the current exotherm problem clearly.

Glycidyl epoxy groups of the type found in these resins usually have a heat of polymerisation in the region of 98.4 KJ per mole (23,500 cals per mole).

To increase the final thermal performance it is necessary in most structural aerospace applications to use an epoxy resin with a rigid backbone and a higher epoxy content to increase the final cross link density. These resins with a high epoxy content result in high heat of polymerisation.

Current "state of the art" lower exotherm prepregs are made with a blend of difunctional liquid and solid epoxy resins and have a lower final thermal performance. If there is too much liquid in the formulation they are too tacky to handle and do not have sufficient body to maintain the fibres in place. If there is too much solid resin then they become rigid and brittle. The ratio of liquid to solid epoxy resins in most such prepregs usually falls in the range of 60:40 to 40:60 by weight.

Examples of such lower exotherm epoxy prepregs are sold by Hexcel Corporation under the product names M9, M9F, M11, M11.5 and those sold by Gurit (UK) Limited under the product names WE90, WE91, and WT93 and would have an average heat of polymerisation in the range 230 to 375 KJ/Kg when measured using Differential Scanning Calorimetry (DSC).

All of these epoxy prepregs require an indeterminate dwell to allow the cure to first take place at a slow reaction rate to prevent a damaging exotherm in thicker laminates.

To improve productivity and reduce the risk of exotherm damage for new components an increasing trend is to attempt to model the cure cycle dwell times to optimise the curing processing, but even this often leads to only small percentage reductions in the overall cure times. Each newly configured composite material part then requires a new remodelling and optimising process.

To avoid the need for this simulation it would be highly desirable to reduce the exotherm so that any heat generated would be insufficient to damage the mould tool or other materials within the laminate stack to allow a simpler, more tolerant, cure to be used that would negate the need for an inteimmediate dwell step.

One current approach in prepregs to reducing the curing exotherm is therefore to have a more gradual heat release after the temperature of curing initiation (T onset) has been attained, to give an opportunity to control heat release with a more gradual reaction rate.

Thus there is a major need in the composite materials industry to provide improved, more versatile prepregs that possess a reasonable storage life, are free from strong smelling or significantly volatile materials, have no adverse reactions during storage and use, have good drape and tack for the desired application, have good mechanical and thermal resistance, and can be cured quickly without a damaging exotherm event.

A prepreg with these characteristics would be a major advance for most composite fabrication applications and it is an aim of this invention to provide such a prepreg.

It is accordingly an aim of this invention to provide a prepreg, a method of manufacturing prepregs and a method of processing prepregs which at least partially overcomes at least some of these significant disadvantages of the existing fibre and/or resin materials currently used to manufacture prepregs.

SUMMARY OF THE INVENTION

The present invention provides a prepreg comprising a fibrous material contacting a polymerisable resin, at least 50 wt % of the polymerisable resin comprising at least one polymerisable monomer having at least two carbon-carbon unsaturated functional groups, the monomer being polymerisable by reaction to form a cured resin, wherein the resin has a heat of polymerization of less than 230 KJ/kg to provide a maximum increase in temperature of the prepreg of 60° C. during polymerisation under adiabatic conditions. The reaction may include a free radical reaction.

The present invention further provides a method of producing a prepreg, the method comprising the steps of:
 i. providing a first reactant having a first functional group which comprises a carbon-carbon unsaturated double bond, and a second functional group;
 ii. providing a second reactant;
 iii. reacting the first and second reactants together by reacting the second functional group with the second reactant, and optionally reacting the product with a third reactant, to form a polymerisable resin, at least 50 wt % of the polymerisable resin comprising at least one polymerisable monomer having at least two of the carbon-carbon unsaturated first functional groups, the monomer being polymerisable by free radical reaction of the first functional groups to form a cured resin; and
 iv. contacting a layer of a fibrous material with the polymerisable resin to form the prepreg.

The present invention further provides a prepreg comprising a fibrous material at least partially impregnated with a radical curable, polymerisable, polyfunctional unsaturated resin, the resin comprising at least one polymerisable monomer, at least 50 wt % of the polymerisable monomer having the general formula $A_n$-B, wherein A is an unsaturated functional group derived from the reaction of one molecule of a hydroxyalkyl ester of acrylic or methacrylic acid with one molecule of a dicarboxyl acid or acid anhydride and B is a functional group derived from a multi functional epoxide having n epoxide groups where n is at least 2.

The present invention further provides a prepreg comprising a fibrous material at least partially impregnated with a radical curable, polymerisable, polyfunctional unsaturated resin, the resin comprising at least one polymerisable monomer, at least 50 wt % of the polymerisable monomer having the general formula $C_m$-D, wherein C is an unsaturated functional group derived from a glycidyl acrylate or methacrylate and D is derived from a multifunctional compound having m reactive sites, each reactive site being capable of reacting with an epoxide group and each being derived from a carboxylic acid, a phenol, or at least one of a primary amine or a disecondary amine, and m is at least 2. The multifunctional compound may be based on an epoxy or other resin.

The present invention further provides a prepreg comprising a fibrous material contacting a polymerisable resin, at least 50 wt % of the polymerisable resin comprising a polymerisable monomer comprising a polyvinyl ester, the vinyl group comprising an acrylate or methacrylate group and the polyester including an epoxy resin residue, the monomer being free radical polymerisable to form a cured resin, wherein the resin has a heat of polymerization of less than 230 KJ/kg.

The present invention yet further provides a method of producing a moulded fibre-reinforced composite material, the method comprising:
 a. providing a plurality of prepregs produced according to the invention;
 b. forming a stack of the prepregs on a mould surface; and
 c. polymerising the monomer in the prepregs to form a cured resin matrix containing the fibrous material.

Optionally in step c the monomer is co polymerised with other reactive materials in the prepreg.

For all of these inventions, preferred features are defined in the dependent claims.

Compared to known approaches to attempt to reduce cure times and/or the curing exotherm as discussed above, the present invention can do away with such complications in the cure cycle and instead directly addresses the fundamental prepreg curing process, to provide prepreg cures which are simple, and allow the prepreg to be heated as quickly as possible to the final temperature and to be held for the minimum time taken to cure the thinnest part.

The present invention is at least partly predicated on the finding by the present inventors that a key problem in formulating a snap curing prepreg is to prevent the excessive heat rise in the laminate. If the material is to cure quickly there is little time to lose heat generated during the reaction. The rise in temperature of the laminate begins to approach the adiabatic case where all of the heat energy of the reaction is absorbed by the material. The adiabatic case is also approached in thick laminates where the surrounding material insulates the centre so that the heat is produced at a much greater rate than can be lost to the environment. The maximum adiabatic temperature which can be achieved during any prepreg moulding cycle, and hence the worst possible case, is given by the equation:—

$$T_{max\,rise} = \frac{A \cdot B \cdot C}{A \cdot D + (1-A) \cdot E}$$

Where:—
A=weight fraction of the resin formulation in the prepreg (Rw)
B=the heat of polymerisation of 1 mole of reactive group in KJ
C=the number of moles of reactive groups in the resin formulation per Kg
D=the heat capacity of the resin system in KJ/Kg·K
E=the heat capacity of the fibre used in KJ/Kg·K To avoid confusion with the epoxy content the following definitions are used throughout:
  Epoxy Functionality=Epoxy Equivalency=Number of epoxy groups per molecule
  Epoxy Value (EV)=Epoxy Content/Kg=Number of gram moles of epoxy groups per Kg and in the case of an epoxy resin is equal to "C" in the above formula
  Epoxy equivalent weight (EEW)=Material mass in grams containing 1 gram mole of epoxy group=1000/Epoxy Value (EV)

The value of B (heat of polymerisation of 1 mole of reactive group in KJ) multiplied by C (the number of moles of reactive groups in the resin formulation per Kg) is also referred to as the Heat of Polymerisation of the resin (ΔHresin) which can measured by Differential Scanning calorimetry (DSC) and has units J/g or KJ/Kg The Maximum heat of polymerisation or epoxy content for a given heat rise can be calculated by rearranging the above formula;

$$\Delta Hresin = B \cdot C = T_{MaxRise} \cdot \left[\frac{A \cdot D + (1-A).E}{A}\right]$$

One known technique used to reduce the resin curing exotherm is to minimise the resin content ("A" in the above formula). The amount of resin will always be limited by the fibre type, fabric format, the actual task the prepreg is expected to perform and manufacturing tolerances. In some applications resin contents can be reduced as low as 28% w/w resin where maximum fibre packing can occur and higher consolidation pressure can be generated by the use of an autoclave. Other applications need much more resin to accommodate woven or lofty fabric reinforcements or additional resin to fill other gaps in the remaining laminate structure created by fabric overlap points, ply bridging, or gaps between materials such as foam cores. As such it is usual for glass unidirectional prepregs using vacuum only consolidation to have resin contents as low as 32+/−2% resin by weight and carbon unidirectional prepreg at 35+/−2%. Woven or stitched fabric reinforcements generally do not compact as well as the unidirectional materials and the resin content would be higher, typically 35+/2% for glass and 42+/−2% for woven carbon fabrics.

To derive the maximum temperature reached in the laminate, it is necessary to add the curing temperature ($T_{cure}$) to the resin system adiabatic rise ($T_{max\,rise}$)

$$T_{Max} = T_{MaxRise} + T_{Cure}$$

where
$T_{cure}$=Heat of cure of the prepreg (° C.).

In the following calculations the average heat capacities across the curing temperature range of interest have been used; glass fibre 0.840 KJ/KgK, carbon fibre 0.710 KJ/KgK, uncured polymeric resin 1.884 KJ/KgK. A rule of mixtures approach has been used to derive the combined heat capacity of the prepreg based on the fibre type and resin content.

FIGS. 1 and 2 show the relationship between the predicted adiabatic temperature rise and the heat of polymerisation of the resin for the resin alone and for various known prepregs, using fibre types and resin contents typically found in known composite laminates. FIGS. 1 and 2 respectively show the maximum heat of polymerisation required to achieve a 60° C. or 40° C. maximum adiabatic temperature rise in the prepreg or resin.

Thus taking the higher resin content case of the 44% carbon fibre prepreg from FIGS. 1 and 2, if the maximum temperature is to be limited to 160° C. then the adiabatic heat rise must be limited to;

Max Temperature 160° C.=120° C. cure+40° C. Max Adiabatic Temp rise~115 KJ/Kg heat of polymerisation Max Temperature 160° C.=100° C. cure+60° C. Max Adiabatic Temp rise~170 KJ/Kg heat of polymerisation Max Temperature 160° C.=60° C. cure+100° C. Max Adiabatic Temp rise~275 KJ/Kg heat of polymerisation Referring again to FIGS. 1 and 2, a resin with a higher heat of polymerisation can be afforded in the 32% resin content glass prepreg as there is less reactive content per Kg. If the maximum temperature is to be limited to 160° C. then the adiabatic heat rise must be limited to;

Max Temperature 160° C.=120° C. cure+40° C. Max Adiabatic Temp rise~150 KJ/Kg heat of polymerisation Max Temperature 160° C.=100° C. cure+60° C. Max Adiabatic Temp rise~225 KJ/Kg heat of polymerisation Max Temperature 160° C.=60° C. cure+100° C. Max Adiabatic Temp rise~375 KJ/Kg heat of polymerisation To limit the maximum temperature to 100° C. to use lower temperature tooling the maximum temperature rise is further reduced. Taking the 32% resin content glass prepreg:

Max Temperature 100° C.=60° C. cure+40° C. Max Adiabatic Temp rise~150 KJ/Kg heat of polymerisation For the higher 44% carbon prepreg the heat of polymerisation must be lower:

Max Temperature 100° C.=60° C. Max Adiabatic
Temp rise C cure+40° C. Max Adiabatic Temp
rise~115 KJ/Kg heat of polymerisation It may be seen from FIGS. 1 and 2 that the 32% resin weight (Rw) glass fibre prepreg generally tends to exhibit a lower adiabatic temperature rise than a 44% resin weight (Rw) carbon fibre prepreg for a given heat of polymerisation of the resin. These represent typical practical limits for prepregs by varying the resin and the fibre amount and type for high performance fibre reinforced resin matrix composite materials. Intermediate plots for 35% resin weight (Rw) carbon and glass fibre prepregs are also shown in the Figures. When the resin is used alone, there are no fibres present to absorb the heat of polymerisation and so the adiabatic temperature rise is very high for a given heat of polymerisation of the resin. For each Figure, the maximum limit of the heat of polymerisation for each prepreg type to achieve a respective adiabatic temperature rise is also illustrated.

The inventors have recognised that lowering the adiabatic temperature rise can only be achieved either by reducing the number of epoxy groups in a standard epoxy resin prepreg or by utilising different reactive groups possessing a lower heat of polymerisation or both.

In order to achieve short "snap" cure cycles, and greatly speeded production rates, the heat evolution and adiabatic temperature rise which occurs with the current commercial products must be reduced to the point where it can be almost totally absorbed by the heat capacity of the prepreg.

Given that the resin content cannot be reduced below a minimum value to maintain the laminate quality the alternative ways to reduce the formulation temperature rise when curing composite prepregs quickly and quasi adiabatically; are 1. Increasing the thermal capacity of the prepreg; 2. Reducing the cure onset temperature of the prepreg so a larger heat rise can be tolerated; or 3. Reducing the heat of polymerisation of the resin composition.

Concerning option 1, nothing can be done to reduce thermal capacity of the fibres and which are nearly always present in a majority by weight and in a well designed prepreg often close to the maximum packing density. Additional fillers to increase the heat capacity simply add parasitic weight and lower the specific mechanical performance. Little can be altered in relation to the composition of the resins employed that significantly affects the thermal capacity of the formulation and, although slight variations are possible with such polar materials, the compositions are necessarily subservient to the overall properties desired from the end product.

Concerning option 2, the hardener of choice for epoxy prepregs is usually a mixture of finely divided dicyandiamide coupled with a latent urea accelerator. With this composition it is extremely difficult to achieve any significant onset of cure below 70° C., more typically 80° C. Imidazoles can be used to promote lower temperature cure but as well as being more expensive materials these prepregs tend to suffer from short out-lives (days to one or two weeks) preventing easy use. Although a lower cure onset would help reduce the final exotherm temperature in the thicker sections the problem still remains in also ensuring a full and rapid cure in the thinner laminates. As the cure rate at the low temperature is slow with these hardeners, cure cycles are still long as the temperature must be raised after the exotherm has been controlled to cure the thinner laminate areas within a reasonable timeframe. As such the current state of the art prepregs require a relatively long time period for fully curing a component comprised of such prepregs.

Concerning option 3, and taking the glass fibre 32% resin content prepreg as an example, in order to achieve an adiabatic temperature rise of the laminate of 40 C and, together with a cure temperature of 120° C., to reach the ideal maximum laminate temperature of 160° C., the maximum heat of polymerisation of the resin can be calculated to be;

$$\Delta Hresin = B \cdot C =$$

$$T_{MaxRise} \cdot \left[\frac{A \cdot D + (1-A) \cdot E}{A}\right] = \frac{0.32 \cdot 1.884 + 0.68 \cdot 0.840}{0.32} = 147 \text{ KJ/Kg}$$

With epoxy resins this requires a maximum Epoxy Value (EV) of 147/98.4=1.49. This in turn then equates to an equivalent weight EEW of 1000/1.49=670.

With a Bisphenol A epoxy resin, this would require an average Molecular weight of 1,300~1,500 and would be too rigid to function as a handleable prepreg.

FIG. 3 shows the relationship between the theoretical adiabatic temperature rise of a prepreg comprising glass fibre in a resin matrix, the resin content being 32+/−2 wt %, comprising a currently known di-functional diglycidyl ether bisphenol A (DEGBA) resin (the y-axis) and the approximate molecular weight, for such a di-functional epoxy resin, of the prepreg (the x axis). The physical transition points of a di-functional DGEBA resin, going from liquid, to semi-solid, to solid are overlaid along the top of the graph in the x-axis direction, these being a function of the average molecular weight, and consequently the epoxy equivalent weight (EEW) for such a di-functional epoxy resin. The vertical boundary lines show a typical range of the average molecular weight (related to the epoxy equivalent weight) for handling di-functional DEGBA resins, within the semi-solid range which is required for producing the prepreg and subsequent storage and handling.

It may be seen from FIG. 3 that when the theoretical adiabatic temperature rise of an epoxy resin on curing and the epoxy equivalent weight of the prepreg and the corresponding heat of polymerisation are considered for a di-functional DGEBA resin, it is found that it is virtually impossible to achieve the required low adiabatic temperature rise, corresponding to a low heat of polymerisation of the resin, while maintaining a flexible resin, the liquid to solid transition being a function of the molecular weight or molecular weight distribution. Therefore, even using di-functional DGEBA epoxy resin with a maximum epoxy equivalent weight (EEW) of 670 (Mwt 1300~1500), at this EEW the resins are very brittle solids and have far too high melt viscosity for prepreg production or processing. Similar problems exist with other epoxy resins which would normally be used including those based on Bisphenol F, other epoxy novolac resins and/or all their halogenated derivatives and the like.

Increasing the amount of the highest molecular weight epoxy resin and diluting it with the lowest molecular weight would reduce the epoxy content per Kg. A blend of approximately 82% of the highest molecular weight regular epoxy resin diluted with 18% of the lowest molecular weight liquid epoxy resin would have an epoxy content of around 1.49 equivalents per kilo and would still be an intractable material with a very high melt viscosity and hence quite unsuitable for this purpose.

Blends of high and low molecular weight resins could also be diluted with a non reactive diluent to give tack and drape, provided the epoxy content does not significantly exceed 1.49 equivalents per kilogram. However, when cured it is most unlikely to have the mechanical properties or the Tgs required due to the amount of diluent required and will be very sensitive to ambient temperatures for tack and drape properties and so is still unsuitable.

An alternative approach would be to replace some of the repeating aromatic Bisphenol A units with other short chain oligomeric diacids by reacting these acids with liquid Bisphenol A epoxy resins. Diacids of this type are available commercially or can be readily synthesised from diols and anhydrides or diacids by condensation. However, if the polyesters resulting from these reactions are relatively rigid, thus maintaining higher glass transition temperatures (Tgs), they usually have very high melt viscosities and if they are based on a flexible chain the viscosities are usually somewhat lower but yield low Tgs and so in either case less than perfect.

Another alternative approach is to partially react the epoxy resins with amines to reduce the epoxy content. With most amines reducing the epoxy content to the level of 1.49 equivalents per kilogram will result in extremely brittle fusible products or, depending on the functionality of the amines, gelled materials. Neither is suitable for the target prepreg products.

Long chain amines which can be used to give flexibility after reaction without gelation will comprise very flexible molecules in themselves and will give low Tgs when cured. There is also the constraint on these amines that when fully reacted to give partially reacted epoxy resins the tertiary amine remaining as a result of the reaction must not be active in the homopolymerisation of the remaining epoxy groups or in catalysing the epoxy/hardener reaction and so significantly reducing the shelf life of the prepreg made from them.

Thus it almost impossible to make an epoxy functional prepreg which will not exceed the maximum adiabatic temperature needed by the industry, together with all the other necessary properties for economic manufacture, processing, use and cured mechanical performance.

The person skilled in the art is aware of a number of reactive groups which may be practically considered for use in the majority of prepreg composite resin systems. The most important reactive groups for consideration are primarily epoxy groups and unsaturated carbon to carbon bonds.

The unsaturated carbon to carbon bonds are also used widely in the course of manufacturing composites. Many compounds containing these groups can be free radical reacted either amongst themselves to form homopolymers or with other unsaturated molecules to give copolymers.

Table 2 shows the heat of polymerisation of a number of different reactive groups.

TABLE 2

| Typical Heat of Polymerisation | |
| --- | --- |
| Material | Energy of polymerisation - KJ/mole |
| Methacrylates on average | 55.3 |
| Maleic anhydride | 59.0 |
| Diethyl fumarate | 64.9 |
| Styrene | 72.9 |
| Maleic anhydride/styrene mixture | 78.3 |
| Acrylate groups on average | 79.6 |
| Epoxy Group | 98.4 |

It can be seen from Table 2 that the heat of reaction of an unsaturated group is less than that of a typical epoxy group epoxy and in broad terms methacrylates, when free radical polymerised, generate only half the heat output of a typical reacted epoxy group and hence for a set number of active groups per unit weight give rise to about half the adiabatic temperature increase. Other unsaturated groups have at least 20% less heat of polymerisation than epoxy resins.

This type of free radical cured unsaturation has long been known and used commercially in the liquid unsaturated polyester and vinyl ester laminating resins. In these instances the solid or semi solid polyesters usually contain maleic or fumaric acid derivatives, or in the case of the vinyl esters methacrylic, all of which are copolymerised with quite large amounts of reactive diluents, particularly styrene, typically 35-45% by weight to reduce the viscosity and material cost The use of magnesium oxide is well known to B-stage these resins to semi-solid consistencies to manufacture SMC and dough moulding compounds and more recently vinyl ester prepregs (U.S. Pat. No. 6,436,856B1 discussed above). The total number of reactive groups in these resins is high, mainly due to the amount of reactive diluent, with the resultant heats of polymerisation typically being 300-450 KJ/Kg leading to higher adiabatic heat rises than the epoxy resin equivalent products. Taking the 32% wt glass fibre prepreg discussed above, this equates to an adiabatic temperature rise of 95 C-123° C. at these respective heats of polymerisation.

As such it is unusual to use these materials in thick laminates as it can become difficult to control the exotherm and at the same time achieve a complete cure. This is due to the difficulty of controlling the snap curing characteristic of radical curing agents. Selective inhibitors are required to control the cure rate which in turn make it difficult to ensure a complete cure for a given cure temperature.

The temperature rise is such that the boiling point of the styrene reactive diluent can be exceeded (145° C., at 1 atm, and substantially lower when processed under vacuum, the actual boiling point depending on the level of vacuum employed; for example with a 98.5% vacuum styrene will boil at 25° C.). This exacerbates the additional disadvantage of these materials as the diluents usually have a strong smell and a relatively high vapour pressure. These gives rise to health and pollution concerns and, unless high levels of vapour extraction and recovery are used, an unpleasant working environment. As stated earlier the use of styrene also adds significantly to the heat release per Kg as styrene monomer has high polymerisation energy of 700 KJ/Kg due to the combination of its low molecular weight (104) and higher energy of polymerisation per mole (72.9 KJ/mol).

For these reasons and because the polymerisation of unsaturated groups leads to a substantial volume shrinkage after gelation ranging from 4% to around 14% the polyesters and vinyl esters have not replaced epoxy resins in the highest performance composites as such shrinkages can induce high stresses into the cured resin and hence the composite. The epoxy groups do shrink on cross linking but this is mitigated to a substantial extent by the expansion caused by the opening the highly stressed cyclic ether epoxy ring resulting in an overall contraction in the region of from 1% to 3%.

The high level of shrinkage in wet lay-up unsaturated laminating systems is partially mitigated when they are used in an unconstrained system allowing cure and the subsequent shrinkage to naturally occur from the tool face of the laminate towards the unconstrained free surface. This shrinkage still leads to dimensional inaccuracy and the tendency of fabric patterns to appear in the final moulding surface unless additional buffer layers utilising light weight woven or non woven fabrics are added before the heavier weight structural reinforcement. Shrinkage is very damaging in closed moulding systems, and on curved surfaces where such accommodation does not, or only, partially exists. Shrinkage can not only lead to dimensional inaccuracy but high residual stresses that can cause early failures or cracks in the laminate after moulding. The dimensional shrinkage becomes more difficult to accommodate in larger parts such as boats and wind turbines etc. Here the overall contraction is significant and the shrinkage can lead to pre-release where the part separates from the mould tool making it difficult to subsequently use the mould tool as an integral assembly jig for bonding parts together.

Most importantly this is much less the case with epoxy composites when with low shrinkage and very low vapour pressures only vacuum pressure is needed for composite production and is frequently employed to great advantage.

BRIEF DESCRIPTION OF THE DRAWINGS

Embodiments of the present invention will now be described by way of example only, with reference to the accompanying drawings, in which.

DETAILED DESCRIPTION

The present invention is at least partially predicated on the finding by the present inventors that the formulation temperature rise when curing composite prepregs quickly and quasi adiabatically can be lowered dramatically by reducing and/or changing the reactive groups present in the resin monomers and their concentration per unit weight and reducing the cure temperature of the reactive resin.

Furthermore, the present invention is at least partially predicated on the additional finding by the present inventors that as well as lowering the curing temperature and exotherm by modifying the chemistry of the monomers, the resultant cured polymeric resins can exhibit mechanical and physical properties similar to or even enhanced as compared to known epoxy resin systems. In contrast, as discussed above it was generally believed that selecting non-epoxy monomers in order to lower the curing temperature and exotherm led to reduced mechanical properties as compared to conventional epoxy resins used for high performance fibre reinforced resin matrix composite materials.

These compositions are generally based on polymerisable or copolymerisable unsaturated reactive groups set at a level which ensures that the maximum adiabatic temperature rise achieved in the fibre reinforced laminate cannot exceed 60° C. and most desirably 40° C.

The unsaturated groups are typically methacrylate, acrylate or maleic types. In the latter case these may usually be mixed with methacrylates to obtain ready copolymerisation.

The compositions of use may well be mixtures of many different materials containing these reactive groups or others which can copolymerise with them.

Typical of the types of material to be employed in this invention are:—

1) The reaction products of hydroxyalkyl methacrylates or hydroxyalkyl acrylates with anhydrides to form carboxylic acids which are then further reacted with epoxy containing compounds to substantially remove the carboxyl groups.
2) The reaction products of glycidyl methacrylate with simple or oligomeric carboxylic acids, phenols and primary or disecondary amines which may contain resinous moieties.
3) The reaction products of hydroxyalkyl methacrylates or hydroxyalkyl acrylates with simple or oligomeric polyacids.
4) The reaction products of methacrylic or acrylic acid with simple or oligomeric polyols.
5) The reaction of unsaturated polyacids or unsaturated cyclic anhydrides with simple or oligomeric alcohols to yield acids which may be further reacted with alcohols or epoxy containing compounds.
6) The reaction of unmodified unsaturated acids with epoxy containing compounds.

It should be understood that the anhydrides, polyols or polyacids referred to above may contain a variety of other groups which either do not interfere with the unsaturated polymerisation reactions or take part in them.

Figure 1:
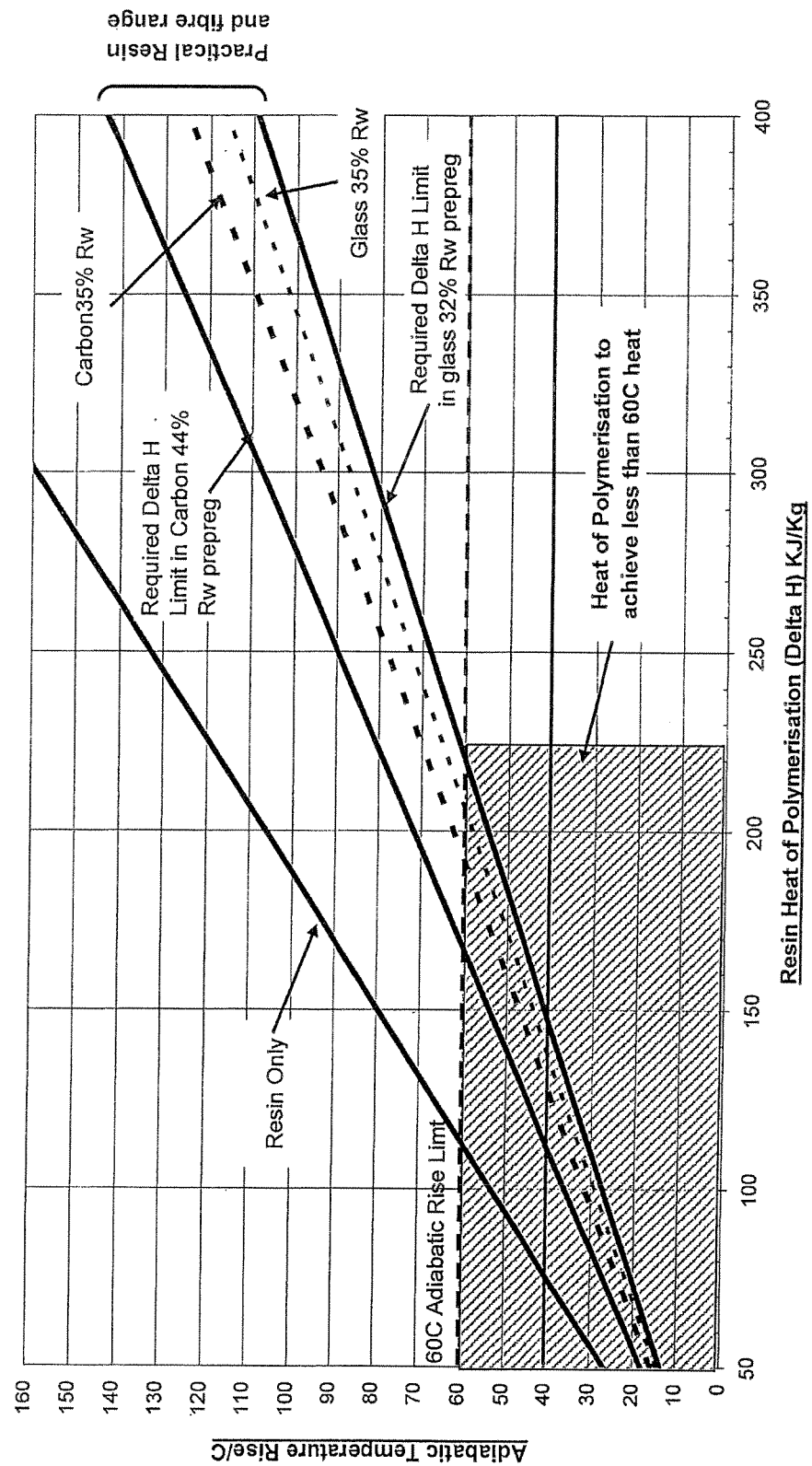
FIG. 1 shows the relationship between the adiabatic temperature rise and the resin heat of polymerisation of pure resin and known prepregs comprising glass fibre reinforced resin or carbon fibre reinforced resin, and also indicates the heat of polymerisation required to achieve an adiabatic temperature rise of no more than 60° C.
Figure 2:
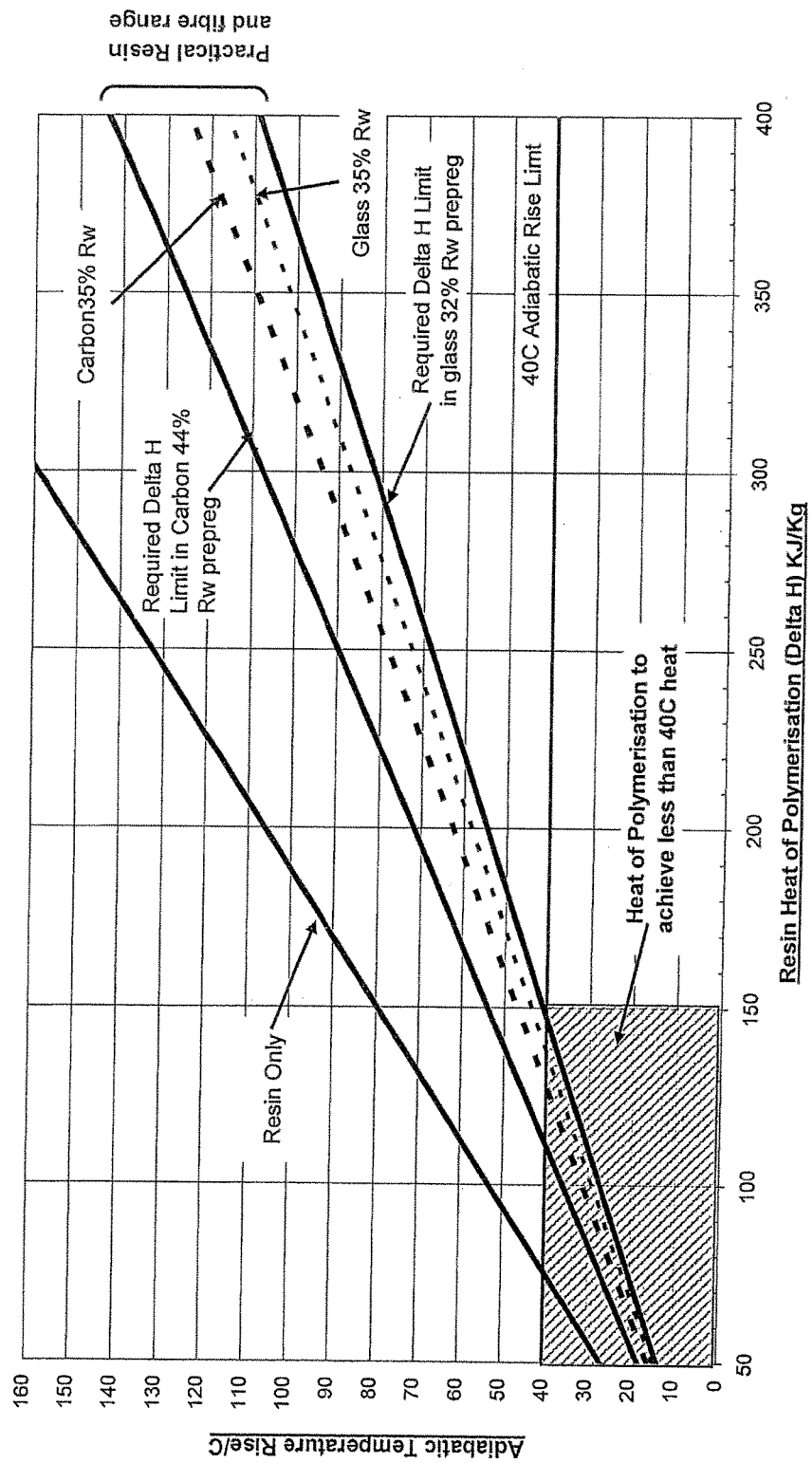
FIG. 2 shows the relationship between the adiabatic temperature rise and the resin heat of polymerisation of pure resin and known prepregs comprising glass fibre reinforced resin or carbon fibre reinforced resin, and also indicates the heat of polymerisation required to achieve an adiabatic temperature rise of no more than 40° C.

As discussed above, in the state of the art the use of epoxy resins in prepregs causes problems due to the very great exothermic emission of heat from the resin on curing. For example, a typical di-functional flexible epoxy prepreg with an epoxy content of 3.7 gram moles of epoxy groups per kilogram has a heat of polymerisation of 365 KJ/Kg. The temperature increase that the resin only would reach under adiabatic conditions may be calculated as being about 193° C. The temperate rise of the composite material, including the fibres and the resin, would be affected by the nature and amount of the fibres present in the composite material, as is known in the art. A greater proportion of fibres allows a greater heat absorption by the fibres as shown in FIGS. 1 and 2.

The analysis of the current inventors presented in FIGS. 1 and 2 identifies that a heat of polymerisation of below 230 KJ/Kg is required for a 60° C. heat rise in the lowest resin content 32% glass fibre prepreg and this must be reduced further to 175 KJ/Kg to accommodate the higher 44% resin content carbon fibre prepreg in order to eliminate the intermediate temperature dwell stage and then allow a hardener to be selected that gives a rapid snap cure characteristic to reduce the overall cure time of composite laminates.

To further reduce the heat rise the analysis identifies that a heat of polymerisation of below 155 KJ/Kg is required for a 40° C. heat rise in the lowest resin content 32% glass fibre prepreg and this must be reduced further to 120 KJ/Kg to accommodate the higher 44% resin content carbon fibre prepreg.

In contrast, in accordance with the present invention, an embodiment thereof may use as the prepreg resin monomer the reaction product of 2 moles of hydroxyethyl methacrylate acid phthalate with one mole of an epoxy resin. The epoxy resin reacts with the carboxyl groups on the HEMA acid phthalate, and typically has a molecular weight of from 200 to 600, typically from 350 to 500, most typically about 380. The latter monomer would have an unsaturation content of 2.1 gram equivalents per kilogram corresponding to a heat of polymerisation of 115 KJ/Kg. The temperature increase this would reach as resin only under adiabatic conditions would be just 63° C. FIGS. 1 and 2 show that with this resin it is possible to achieve less than a 40° C. adiabatic heat rise for all of the range of fibre reinforced laminates detailed above.

The present inventors have found surprisingly that such a resin provides a remarkable combination of technical advantages, namely good tack and good drape, low material cost, use of low temperature moulds, ready availability of compatible hardeners, UV curable and no resin degradation over a wide cure cycle temperature range, however fast the curing cycle, and with such a resin it is possible to have a snap cure without exothermic damage to the laminate or mould tool.

The resin can be used in a 32% resin content glass fibre prepreg cured at 60, 100 or 120° C. yielding maximum composite temperatures of 91° C., 131° C. or 151° C. respectively. The resin can be used in a high resin content 44% carbon fibre prepreg at the same cure temperatures reaching maximum composite temperatures of only 100° C., 140° C. or 160° C. respectively.

The present invention provides an ability to lower the curing temperature by modifying the chemistry of the monomers, and selecting a curing agent, such as a latent peroxide, to make cured polymeric resins that can exhibit mechanical and physical properties similar to or even enhanced as compared to known epoxy resin systems.

The preferred embodiments of the present invention can provide a rapid (snap cure) curing composite prepreg with an overall maximum temperature of 160° C. in the thickest laminate together with all the other advantages required from the use of prepregs by reducing and/or changing the reactive groups present and their concentration per unit weight and selecting a latent curing agent, e.g. a peroxide, to react at 100-120° C. This allows the prepregs currently in use on 160° C. high temperature tooling to be changed to the material of this invention to increase productivity by the reduction in cure cycle. The higher activating peroxide curing agent then provides a prepreg with a longer shelf life, in excess of 4 months at 20° C., which is higher than is currently available in the state of the art epoxy prepregs. This reduces the need for chilled storage and so reduces transport and shelf life costs.

The preferred embodiments of the present invention can also provide a rapid (snap cure) curing composite prepreg with an overall maximum temperature of 100° C. in the thickest laminate together with all the other advantages required from the use of prepregs by reducing and/or changing the reactive groups present and their concentration per unit weight and selecting a latent curing agent, e.g. peroxide, to react at 60° C. This for the first time allows thick prepregs laminates to be rapidly cured on lower cost 100-110° C. tooling.

This is achieved by using a prepreg resin comprising an unsaturated composition containing far lower levels of reactive groups than current practice and without the need to add styrene monomer, or other diluent, to give a prepreg resin with a suitable handling and viscosity. This gives a generally low adiabatic temperature rise, lower shrinkage and improved health and safety. However, it had been expected that such low levels of cross linking would result in unacceptable mechanical properties.

The present inventors have, however, surprisingly discovered a fibre reinforced prepreg resin composition that can possess a maximum adiabatic heat release of even as low as around 60° C. or less, yield good mechanical properties, have excellent characteristics for handling as prepregs and can be processed rapidly in the range of 60° C. to 120° C. or by curing using UV or visible radiation.

These compositions are generally based on the reaction products of unsaturated carboxylic acids which can be either simple acid monomers or formed from hydroxyalkyl methacrylates, reacted with anhydrides and the resultant acids with oligomeric or simple moieties such as liquid epoxies to remove the acid groups and to provide low unsaturation content monomeric molecules containing low levels of water sensitive primary alcohol or acid groups. These reactions may be sequential or simultaneous. Alternatively faster curing acrylated resins can be produced, referred to in the remainder of the text as acrylates, from either a basic acid monomer or formed from hydroxyalkyl acrylates, and reacted with anhydrides. These acrylated resins are less preferred in the thermal cured prepreg as the heat of polymerisation is significantly higher than equivalent methacrylated resin. The faster cure and higher heat of the acrylated resin is however tolerated and can be of benefit for the UV curing prepregs.

Either of these reactions may be catalysed with the same or different catalysts. Alternatively, either or both of the reactions may be uncatalysed. Most of the effective catalysts for these reactions are well known from other areas of synthesis and include tertiary amines and phosphines, quaternary ammonium salts, Lewis acids and bases and a wide variety of organo and inorganic metallic salts.

An alternative method of introducing this unsaturation into the monomeric molecules is by the reaction of unsaturated glycidyl esters with compounds which will react with the epoxy glycidyl group without significantly interfering with the unsaturated methacrylic group. Compounds which can do this include acids, phenols, alcohols and some secondary and aromatic amines, amongst others. Of these the acids, phenols and amines are the most useful. Glycidyl methacrylate is the most useful unsaturated epoxy containing material of this type that is readily commercially available but many other glycidyl esters of unsaturated acids may be synthesised by the dehydrochlorination of the acid reaction products with epichlorhydrin. Again the reaction may employ catalysts or not, the selection being to suit production methods and other formulation ingredients.

In all these reactions free radical inhibitors, such as 1,4-benzoquinone (BQ), and 2-Methoxyhydroquinone (MEHQ), may be employed and the levels and types adjusted to prevent premature gelation during production, prepreg manufacture and storage. Such inhibitors may also be used to adjust final cure rates as desired.

A method of introducing a different reactivity unsaturated group is to react a monomaleate, fumarate, itaconate or other unsaturated acid functional ester or their precursor acids with an epoxy containing molecule or to incorporate any of the acids or anhydrides of these into a precondensed acid terminated polyester before reaction with the epoxy containing material.

Whilst these maleic type unsaturated functional resinous materials will not easily homopolymerise, they may be mixed with the methacrylic functional species in this invention or mixed with any other monomer or oligmer that will copolymerise with them and be cured.

Considering the average polymerisation of a methacrylic group of 55 KJ/mole, in order to maintain an absolute maximum adiabatic temperature rise of 40 C and hence overall temperature of 160° C. when cured at 120° C., the prepreg should have a heat of polymerisation no higher than 155 KJ/Kg and therefore should contain no more than around 2.7 moles of unsaturation per kilo of prepreg for a 32% weight percent resin content glass fibre prepreg or the prepreg should have a heat of polymerisation no higher than 120 KJ/Kg and therefore should contain no more than 2.1 moles of unsaturation per kilo of prepreg for the higher resin content 44% weight percent resin content carbon fibre prepreg. Such consideration may be less significant for radiation cured prepregs where they are irradiated at a lower starting temperature so a greater heat rise can be tolerated.

Preferably the unsaturation level will not exceed 6.6 moles per kilo of prepreg when cured at 60° C. to yield a maximum laminate temperature of 160° C. in a 32% weight percent resin content glass fibre prepreg.

More preferably the unsaturation will not exceed 2.7 moles of unsaturation per kilo of prepreg for a 32% weight percent resin content glass fibre prepreg or 2.1 moles of unsaturation per kilo of prepreg for the higher resin content 44% weight percent resin content carbon fibre prepreg allowing a maximum laminate temperature of 160° C. when cured at 120° C. and a maximum of 100° C. when cured at 60° C.

It might be expected that reducing the active unsaturated group level would severely compromise the mechanical properties of the final structure but very surprisingly this is not the case provided the molecules to which the unsaturated groups are attached are sufficiently stiff, strong or tough as required. This may be partly because whereas in general the epoxy group reacts with hardener molecules to produce one reacted link, each unsaturated group typically produces two reacted links.

Amongst the very large number of substances that could be produced under this invention a typical example of this type of product is defined in Example 1 which is made by reacting 2-hydroxyethyl methacrylate (HEMA) with phthalic anhydride to give the unsaturated ester acid and then reacting this with a basic liquid bisphenol A epoxy resin to the point where the epoxy and acid groups are mostly removed, from now referred to as 2HPE. This molecule has the Bisphenol A backbone structure attached via the two glycidyl residues to two phthalic anhydride moieties and these to two moles of methacrylic terminal ester.

This reaction produces a soft flexible resin ideally suitable for the manufacture of prepregs, containing very low levels of unsaturation and having a basic Bisphenol A-type structure of the backbone. The resin can be used to form prepregs which, when catalysed with latent peroxides or radiation activated initiators, possess excellent storage capabilities and cure readily with no dwell cycle and low adiabatic heat rise to give composites with low shrinkage and good mechanical properties. In its pure resin form 2HPE has an unsaturation content of around 2.1 moles per kilo and has a theoretical heat of polymerisation of 115 KJ/KgK.

Examples 1 and 2, described hereinbelow, disclose the preparation and results from such a resin.

From these examples it may be seen that this invention represents a surprising and extremely important improvement in the provision of novel matrix resins and the prepregs made from them for the composites industry.

It will be clear to those practicing composite matrix resin development that this example is one of a very large number of methacrylates of this type which could be produced and as such should not be regarded as limiting in any way.

Indeed similar prepreg materials can be made from reacting methacrylic acid with a blend of high and low molecular weight epoxy resin to give the desired tack and viscosity suitable for hot melt prepregging to form a styrene free prepreg material as exemplified in Examples 4 and 5, described hereinbelow.

Figure 3:
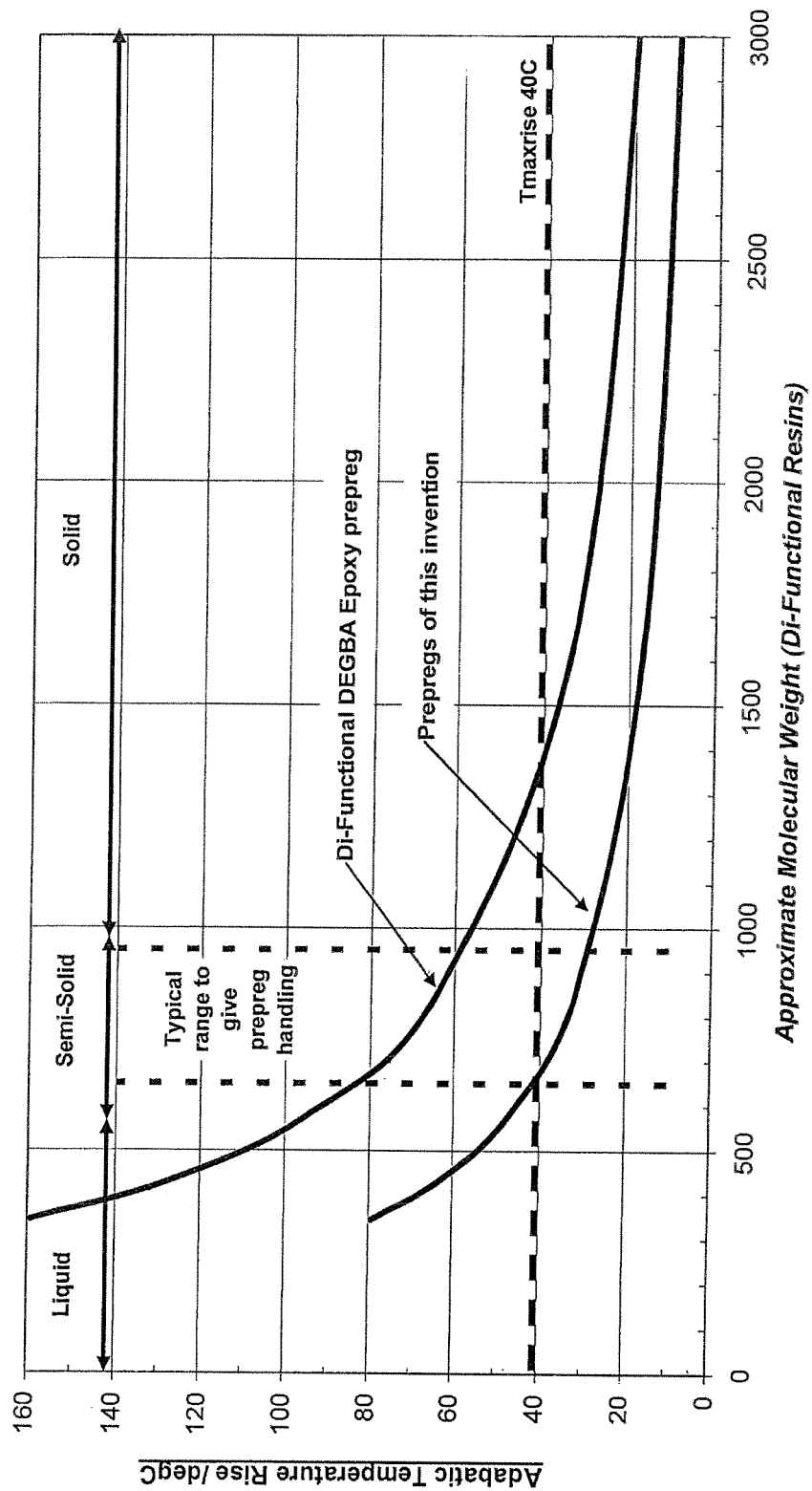
FIG. 3 shows the relationship between the theoretical adiabatic temperature rise and the approximate molecular weight of the resin for both a known prepreg comprising a resin matrix comprising a currently known di-functional diglycidyl ether bisphenol A (DEGBA) resin and a prepreg comprising a resin matrix according to an embodiment of the present invention.

FIG. 3 shows the relationship between the theoretical adiabatic temperature rise of a prepreg comprising glass fibre in a resin matrix, the resin content being 32+/−2 wt %, the resin comprising an unsaturated resin produced in accordance with an embodiment of the present invention, as described hereinbelow with reference to Example 1 (the left hand y-axis) and the molecular weight of the resin (the bottom x axis). The top x axis indicates the physical transition points of unsaturated resin, going from liquid, to semi-solid, to solid, these transition points being a function of the molecular weight.

There is more than one type of unsaturated resin that can be used to give products that produce excellent prepregs for handling and drape as well as complying with the need to keep the heat evolution of polymerisation to the desired level. In many instances resins may be blended together to give particular handling or tack properties as well as final cured mechanical performance. Among these include the HEMA acid phthalate epoxy resin reaction products which are preferred embodiments of this invention and also the vinyl ester resins, optionally used in some embodiments of the invention, which can both be made with different physical properties by varying the molecular weight of the epoxy compound employed. Indeed they may be made together if required in the same reaction vessel. Any of these may also be modified for physical characteristics by the addition of other lower viscosity, low volatility, low odour, unsaturated materials including, for example, the reaction products of HEMA acid phthalate and methacrylic acid with mono epoxy compounds.

From FIG. 3 it can be seen that a variety of semi-solid resin possibilities can be formed that would have the desired lower adiabatic temperature rise, achieved by a lower heat of polymerisation level, and also would have the desired viscosity to enable them to be used for the manufacture of prepregs comprising fibre reinforcement at least partially impregnated by the resin.

It can be seen from the Figures that it becomes possible to formulate a resin with both low heat release, with a Tmax rise of even below 40° C. and a texture within the semi-solid range, and so useful as a prepreg resin.

Of the hydroxy alkyl methacrylates and acrylates, the 2 hydroxy ethyl, 2 hydroxy propyl and 3 hydroxy propyl and any mixtures of them are preferred as they react readily with anhydrides, acids and isocyanates and are widely available. However other hydroxy alkyl methacrylates and acrylates may be used in other embodiments of the invention.

Alternatively or additionally, other methacrylates, acrylates and unsaturated copolymerisable monomers may be utilised as diluents, tack adjusters or to increase temperature resistance or flexibility if required. In general such additional methacrylates should have relatively low odour and volatility. They may be mono or polyunsaturated as needed for a given formulation and end result. Suitable diluents amongst many include polybutadiene dimethacrylate, ethoxylated Bisphenol A dimethacrylate, propoxylated neopentyl glycol dimethacrylate, hexanediol dimethacrylate, 1,4 butane diol dimethacrylate, polybutadiene urethane dimethacrylate, glycidyl methacrylate, allyl glycidylether, isobornyl methacrylate, n,ndimethylaminopropyl methacrylate, trimethylolpropane trimethacrylate, methacrylamide, propoxylated trimethylolpropane trimethacrylate, tris(2-hydroxylether) isocyanurate trimethacrylate, maleic, fumaric, itaconic and other unsaturated alkyl esters, allyl esters and acids.

Unreactive diluents, fillers, thixotropes, pigments, core shell particles, surfactants, foaming agents, fire retardants, smoke suppressors, coupling agents and dyes amongst others may be used for special effects as required. Unreactive or reactive thermoplastics may be incorporated for flow control, viscosity adjusters or tougheners. A variety of inorganic basic compounds may also be used as adjusters of tack, flow and handling texture.

The acids generated from the hydroxyalkyl methacrylates may be derived from any anhydride or polyacids whether simple, oligomeric or polymeric materials based on polyesters, polyethers, polyurethanes or polyureas and the like provided the majority of the unsaturated groups are left unreacted during the esterification. The anhydrides tend to be preferred because they react readily at relatively low temperatures. The most favoured anhydrides are phthalic, maleic, tetrahydrophthalic, methyl tetrahydrophthalic, hexahydrophthalic and isomeric mixtures of methylhexahydrophthalic, nadic, methyl nadic, chlorendic, dodecenyl succinic and mellitic, but mixtures and eutectics of these and other anhydrides are useful, as well as, dianhydrides and polymeric anhydrides.

Some of these anhydrides, particularly maleic anhydride, contain a different unsaturated group which is rather difficult to homopolymerise but relatively easy to copolymerise. This is likely to be the case with a variety of other unsaturated monomers including the methacrylic group on the hydroxyalkylphthalic epoxy esters and provides an interesting molecule which may inter or intramolecularly cross link or more likely both to yield macromolecular structures. However, this molecule has a much higher unsaturated group content and may need to be used in limited quantities to avoid exceeding the set adiabatic temperature rise limit. Using the same techniques it is feasible to produce reaction products with epoxy resins containing both maleic and methacrylic type unsaturations in the same molecule.

The urethanes formed from the hydroxyalkyl methacrylates may be derived from any isocyanate or mixture of isocyanates and include MDI, TDI, HMDI and oligomers of these including dimers, trimers etc and eutectics. These reactions may be carried out simultaneously or sequentially with mixtures of other polyols and the hydroxyalkyl methacrylates.

Additionally, isocyanate functional oligomers or polymers based on polyesters or polyethers with or without containing urethane and urea groups may be used where practical to give prepreg systems with greater levels of toughness or elasticity for special applications. The isocyanates may also be used to attach mono urethanes produced from a hydroxy functional methacrylate and a polyfunctional isocyanate to other isocyanate reactive group such as other hydroxyls, amines, etc. to form grafted molecules. Equally, diisocyanates can be used to join hydroxylalkylmethacrylates to hydroxy functional precondensed polyesters and hydroxy group-containing epoxy resins or residues thereof or other similarly reactive oligomers or resins.

Mixtures containing urethane and urea groups may be useful additionally by ordering themselves in the uncured resin mixture by hydrogen bonding in such a way that they control flow properties of the formulation.

The acids generated by reacting the hydroxyalkyl functional methacrylates with anhydrides or excess of other acids may be reacted with any other material capable of reacting with them to provide a modifying backbone to the molecules. In the case of mono acids these may be reacted if desired with any epoxy containing material of any functionality and will yield unsaturated molecules of approximately the same functionality as the original epoxy containing material if used in stoichiometric ratios. Thus as well as using simple liquid bisphenol A or bisphenol F resins as reactants, higher molecular weight versions could be employed to give lower unsaturation contents as well as stiffer materials. Polyfunctional resins such as the epoxy novolacs could be employed to raise temperature resistance as could glycidylamines. Aliphatic and cycloaliphatic glycidyl ethers and esters are particularly valuable for colour stability especially if the acid esters or other esters are non aromatic. Mono epoxy compounds could give lower viscosity diluents when reacted for the systems. In this case the diluent will not cause chain termination as it would with an epoxy diluent but merely act as a chain extender due to its effective difunctionality.

The epoxy containing materials which may be used as part of this invention include those based on bisphenol A, bisphenol F and oligomers thereof, higher functionality novolacs, amines, amino phenols, esters, unsaturated cycloaliphatic materials, hydantoins and unsaturated oils and mixtures of any of these. Those epoxy resins based on bisphenols A and F, aliphatic and polyfunctional novolacs and mixtures of them are particularly preferred for the majority of applications any or all of which may be halogenated.

These unsaturated compositions are to be cured either by free radicals generated by heat from latent peroxides or free radicals generated by photoinitiators under the influence of ultraviolet (UV) or short wavelength visible light.

Among the useful heat initiated types are tert-butyl peroxybenzoate; tert.Butylperoxy-2-ethyl hexanoate; tert-butylperoxy isopropyl carbonate; tert.Butylperoxy-3,5,5-trimethyl hexanoate; 1,1 bis(t-butylperoxy)-3,3,5,-trimethylcyclohexane; 1,1-Di(tert-butylperoxy) cyclohexane; tert-Amylperoxy 2-ethylhexyl carbonate; tert-butylperoxy 2-ethylhexl carbonate; Methyl Ethyl Ketone Peroxide; Dibenzoyl Peroxide. These free radical generators may have additional compounds added to them to accelerate reaction or stabilisers to delay the onset of radical generation. An advantage of these compounds over the standard curing agents for epoxy prepregs is that in general they are soluble in the resin formulation giving greater homogeneity and more ready access to all reactive groups to effect cure on heating. Another advantage is their good stability in these compositions often yielding a room temperature shelf life of several weeks to several months whereas conventional epoxy prepregs in this curing range would have shelf lives of a several days to several weeks.

For radiation curing, Type 1 free radical photoinitiators which undergo fragmentation on exposure to irradiation can be used, such as α-hydroxy ketones (AHK), α-amino ketones (AAK), and acyl phosphines (MAPO/BAPO). For example, commercially available photoinitiators may be sued, such as Irgacure 819 (BAPO), Irgacure 2022—a blend of Irgacure 819 (BAPO) and Darocure 1173 (AHK), Darocure (MAPO), and Irgacure 2100—Phosphine oxide.

Type II free radical photoinitiators such as benzophenone, fluorenone, and thioxanthone may also be used.

Both Type 1 and II free radical photoinitiators may be used in combination. A photosynergist compound, such as tertiary amines such as triethanolamine (TEA) or methyldiethanolamine (MDEA) may also be used to adjust the reactivity and through cure of the material.

Using these combinations of photoinitiators and synergists the desired wavelength and speed of curing can be adjusted to suit the end application. The prepreg can be capable of curing using natural daylight or designed to be more tolerant to natural exposure and selected to cure with a UV source such as electrode and electrodeless lamps using energised mercury vapour to produce the UV radiation or LED based UV emitters.

The present invention is illustrated further with reference to the following non-limiting examples.

EXAMPLES

To determine the heat of polymerisation, all samples were evaluated using Differential Scanning calorimetry (DSC) using a Mettler Toledo DSC821E apparatus. The dynamic programme used was from −30° C. to 260° C. at 10° C./min, cooled down to 25° C. Enthalpy of reaction was evaluated according to ISO 11357 Parts 1-7.

Exothermic temperatures of laminates were recorded using a calibrated data logger and K-Type thermocouples.

To obtain the Tg of the cured laminates and resins samples they were evaluated by Dynamic Mechanical Analysis (DMA) using a TA Instruments Q800 apparatus employing an operating program of 25° C. to 200° C. at 3° C./min, at a frequency of 1 Hz, in 3-point bending mode. Results tested using this method are referred to as Tg by DMA.

The Tg of smaller resin samples was evaluated using Differential Scanning calorimetry, (Mettler Toledo DSC821E). The programme used was from 25° C. to 250° C. at 10° C./min, cooled down to 25° C. and rerun up to 150° C. to find the ultimate Tg of the sample. Results tested using this method are referred to as Tg2 by DSC.

In accordance with the present invention, surface tack of the resin is measured according to the following testing protocol:

Surface Tack Testing Protocol
1) Allow prepreg sample to stand at Lab temperature (22° C.+/−2° C.) for approximately 10 minutes.
2) Remove the backer on one side.
3) Fold a sample of the prepreg over on its self and stick sides together.
4) Apply light pressure.
5) Carefully peel the prepreg apart and measure the tack level according to the Tack Test Table below:

Rating Description
ZT—Zero Tack
QC-0 Does not stick at all. Surface dry to the touch.
LT—Low Tack—gloved finger easily removed after touching surface
QC-1 Sticks only with firm pressure. Parts very easily. Surface quite dry to the touch
QC-2 Sticks with medium pressure. Parts very easily. Surface has some stickiness
QC-3 Sticks with light pressure. Parts easily. Surface has some stickiness
MT—Medium Tack—gloved finger not easily removed after touching surface
QC-4 Sticks with little pressure. Parts easily. No fibre movement on parting
QC-5 Sticks with little pressure. Parts with some effort. Little fibre movement on parting
QC-6 Sticks with little/no pressure. Parts with some effort. Some fibre movement on parting
HT—High Tack—gloved finger left with resin on after touching surface
QC-7 Sticks with no pressure. Parts with effort. Fibre distorted on parting
QC-8 Sticks with no pressure. Parts with much effort. Fibre distortion on parting & resin "strings"
QC-9 Sticks with no pressure. Parts with much effort. High fibre distortion on parting & resin "strings"
XT—Extreme Tack—glove stretched or torn on attempting to remove it from the surface
QC-10 Sticks with no pressure. Cannot peel apart without destroying fabric/fibre alignment The drape and handling properties were determined by measuring the complex modulus, from which the complex viscosity is determined, and which enabled calculation of the storage and loss moduli of the resin. The complex modulus was measured using a TA Instruments AR2000 rheometer with disposable 25 mm diameter aluminium plates. The complex modulus was measured with the following settings: an oscillation experiment at decreasing temperature from 40° C. down to −10° C. at a rate of 2° C./min with a controlled displacement of $1\times10^{-4}$ rads at a frequency of 1 Hz and a gap of 1000 μm.

This experiment determines G' (Storage Modulus) and G" (Loss Modulus). The phase angle is the inverse tan of the Loss/Storage modulus. For a purely elastic solid (glassy or rubbery), G"=0 and the phase angle δ (between the complex viscosity and the storage modulus G') is 0°, and for a purely viscous liquid, G'=0 and the phase angle δ is 90°. Materials with the highest drape have both a low viscosity and a phase angle close to 90°. In these prepregs the material is easy to shape to the desired geometry and the tendency for it to have an elastic memory to spring back to its original position is reduced.

To determine the flow behaviour the following experiments, to measure resin viscosity during prepregging and the curing processes were performed using a TA Instruments AR2000 rheometer with disposable 25 mm diameter aluminium plates. The experiment was carried out with the following settings: 30° C. to 130° C. at 2° C./min with shear stress of 3.259 Pa, gap: 1000 μm.

Comparative Example 1

To highlight the problem of curing highly exothermic prepreg quickly without a temperature controlling step a conventional multi-functional epoxy prepreg was manufactured. Tetrafunctional epoxide (TGDDM), an epoxide cresol novolac resin, and a liquid DGEBA (n=0-0.2) epoxy resin were blended with an dicyandiamide and substituted urea to give a drapable mid tack QC-4 multi-functional epoxy prepreg, according to the previously described tack testing procedure, with a viscosity of 120 P at 80° C., a heat of polymerisation of 441 KJ/Kg and an ultimate Tg measured by DSC of 155° C.

The resin was suitable for both hot melt fibre impregnation to form either a fully or partially impregnated prepreg with appropriate tack and handling properties and or casting as a separate resin film which can be combined with one or more dry fabrics to form a prepreg where the resin will flow during subsequent processing to form a fully impregnated laminate.

To test the exotherm levels this resin was used to impregnate 300 gsm of 0/90 woven E-glass fibre fabric to give a prepreg with a 35% resin content. 100×100 mm squares of this prepreg were laminated with additional dry plies of 600 gsm woven E-glass glass fibre to reduce the overall resin content to 32 wt % in the laminate. Thermocouples were added to record both the oven and laminate temperature at the stack centres. The material was cured by ramping the oven air temperature at 2° C./min to 120° C. and dwelled at 120° C. until the exotherm event had been completed. The adiabatic heat rise was calculated to be 140° C. based on the measured heat of polymerisation and resin content. For a 120° C. cure the expected peak exotherm temperature was calculated to be 120+140=260° C.

Different thickness laminates were prepared to show the tendency for the laminate temperature to approach the adiabatic temperature rise prediction as the thickness increased. A stack providing a 6.8 mm cured thickness exhibited a peak exotherm of 191° C. and some discoloration, and a stack providing a 14.5 mm cured thickness exhibited a peak exotherm of 247° C. and high discoloration. An experiment using thicker laminates was terminated prematurely and the laminates were removed during cure due to risk of thermal decomposition of the laminate risking toxic fume generation.

As predicted the damaging temperatures predicted by the adiabatic heat rise where reached in the laminate without the intermediate dwell step to control the exothermic heat generation.

Comparative Example 2

A conventional lower exotherm difunctional epoxy prepreg was manufactured in the as known in the epoxy prepreg art using 40 parts Liquid DGEBA (n=0-0.2) and 60 parts solid DGEBA (n=4) epoxy resin were blended with an dicyandiamide and substituted urea to give a drapable mid tack QC-4 difunctional epoxy prepreg, according to the previously described tack testing procedure, a viscosity of 50 P at 80° C., a heat of polymerisation of 298 KJ/Kg, and an ultimate Tg measured by DSC of 110° C.

The resin was suitable for both hot melt fibre impregnation to form either a fully or partially impregnated prepreg with appropriate tack and handling properties and or casting as a separate resin film which can be combined with one or more dry fabrics to form a prepreg where the resin will flow during subsequent processing to form a fully impregnated laminate.

To test the exotherm levels this resin was used to impregnate 1600 gsm of unidirectional E-glass fibre to form a 32% resin content difunctional epoxy prepreg. 100×100 mm squares of this prepreg were laminated into different thickness stacks. Thermocouples were added to record both the oven and laminate temperature at the stack centres. Different thickness laminates were prepared to show the tendency for the laminate temperature to approach the adiabatic temperature rise prediction as the thickness increased.

The material was cured by ramping the oven air temperature at 2° C./min to 120° C. and dwelled for 1 hour at 120° C. to ensure full cure of the thinner laminate sections.

The adiabatic heat rise was calculated to be 83° C. based on the measured heat of polymerisation and resin content. For a 120° C. cure the expected peak exotherm temperature was calculated to be 120+83=203° C. The peak exotherm results are shown in Table 3.

TABLE 3

| Number of Plies | Cured Thickness/mm | Peak Exotherm -° C. |
|---|---|---|
| 10 | 13.0 | 173 |
| 20 | 25.3 | 180 |
| 38 | 43.0 | 202 |
| 56 | 65.5 | 210 |

Each sample exhibited visible discolouration from exotherm damage.

It may be noted that as the thickness increased the exotherm approached, and even slightly exceeded, the estimated adiabatic temperature Tmax, perhaps due to a localised higher resin content or heat of polymerisation of the plies of prepreg in this particular sample or additional heat release due to thermal degradation.

Comparative Example 3

To reduce the exotherm level of the prepreg from Comparative Example 2 and maintain a usable product, a higher solid DEGEBA content epoxy prepreg was manufactured. 35 parts Liquid DGEBA (n=0-0.2) and 65 parts solid DGEBA (n=4) epoxy resin were bended with an dicyandiamide and substituted urea to give a still drapable low tack QC-2 difunctional epoxy prepreg, according to the previously described tack testing procedure, a viscosity of 70 P at 80° C. with an heat of polymerisation of 250 KJ/Kg and an ultimate Tg measured by DSC of 108° C.

This resin was used to impregnate 1200 gsm of unidirectional E-glass fibre to form a 31% resin content prepreg. To find the fastest cure for a typical wind turbine section plies of this prepreg were laid up to give a tapering laminate of 1 to 70 mm in thickness. Different intermediate dwell temperatures and times were tried until the fastest cure was found to prevent excessive exotherm and cure the thinner section.

It was found the fastest cure consisted of the following steps; the oven air temperature was heated to 84° C. in 130 min then dwelled for 270 min then ramped again to 120° C. in 90 min and dwelled for 90 min to ensure full curing of the thinner laminate section. This cure took a total of 9 hours and 40 minutes before commencing the cool down step. Even with this controlling intermediate dwell it was found that on trying a second batch of prepreg the peak exotherm slightly exceeded the target value and was 164° C. suggesting a longer cure cycle would be required to allow for some batch-to-batch variation.

Example 1

A prepreg resin containing 2 unsaturated methacrylic groups was manufactured from an epoxy resin and unsaturated acid to form the unsaturated epoxy ester HEMA acid phthalate 2,2 propyl [di 1,1' (phenyl 4,4' {2-hydroxypropyl ether})] di [ethyl methacrylate] benzene 1,2 dicarboxylate with a theoretical average molecular weight of ~912.

For a 120° C. cure the expected peak exotherm temperature was calculated to be 120+31=151° C. The peak exotherm results are shown in Table 4.

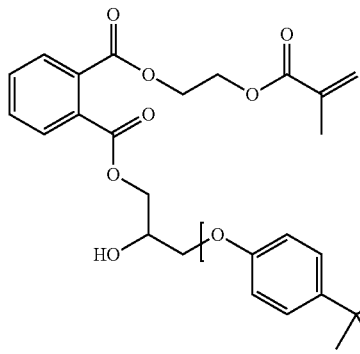
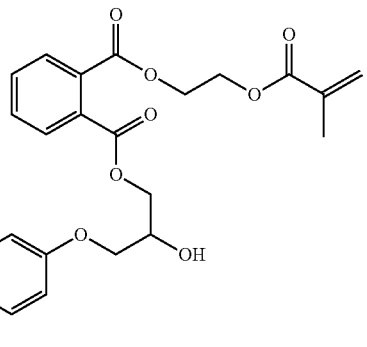

The resin was manufactured by, in a first reaction step, reacting for a period of 2 hours at a temperature of 100° C. 1 mole of hydroxy ethyl methacrylate (HEMA) with 1 mole part of phthalic anhydride to produce HEMA acid phthalate.

Then, in a second reaction step, 2 moles of HEMA acid phthalate were reacted with 1 mole of a di-functional diglycidyl ether bisphenol A epoxy resin having a molecular weight of about 354 (available in commerce under the trade name DER330) for a period of 8 hours at a temperature of 100° C. This provided the unsaturated monomer of the prepreg resin, referred to above as 2HPE.

Subsequently, a peroxide curing agent to act as a polymerisation catalyst for the unsaturated monomer was incorporated into the reaction product by dispersing 1 wt % of a commercially available tert-butyl peroxybenzoate curing agent, available in commerce as Lupernox P, at a temperature of 80° C. into the resin.

This gave a highly drapable low tack QC-2 prepreg resin, according to the previously described tack testing procedure, with a viscosity of 50 P at 80° C., a heat of polymerisation of 113 KJ/Kg and an ultimate Tg measured by DSC of 115° C. The heat of polymerisation corresponded well to the theoretical value of 115 KJ/Kg.

The resin was suitable for both hot melt fibre impregnation to form either a fully or partially impregnated prepreg with appropriate tack and handling properties and or casting as a separate resin film which can be combined with one or more dry fabrics to form a prepreg where the resin will flow during subsequent processing to form a fully impregnated laminate.

To test the exotherm levels, 1800 gsm of +/45 biaxial E-Glass fabric were impregnated with this resin at 80 C to give a 1800 gsm/32.0 wt % resin content glass fibre prepreg. 100×100 mm squares of this prepreg were laminated into different thickness stacks. Thermocouples were added to record both the stack centre and oven air temperatures.

Different thickness laminates, of from approximately 10 to 70 mm, were prepared to show the tendency for the laminate temperature to approach the adiabatic temperature rise prediction as the thickness increased.

The material was cured by ramping the temperature at 2° C./min to 120° C. and dwelled at 120° C. until the exotherm event and cure had been completed.

The adiabatic heat rise was calculated to be 31° C. based on the measured heat of polymerisation and resin content.

TABLE 4

| Number of Plies | Cured Thickness/mm | Peak Exotherm - ° C. | Time to Complete Cure (Start of Ramp + Dwell)/Min |
|---|---|---|---|
| 8 | 10.5 | 127 | 105 |
| 18 | 24.5 | 137 | 120 |
| 34 | 46.5 | 140 | 135 |
| 50 | 67.5 | 137 | 150 |

For each sample, there was no sign of exotherm damage. The adiabatic temperature rise was less than 40° C.

The actual activation and "snap" cure of this resin system occurred before the laminate reached its target temperature of 120° C. at approximately 105~110° C. This resulted in approximately 10° C. lower final peak exotherm temperatures than predicted as the cure proceeded rapidly on reaching this temperature.

From the onset of the reaction the resin was fully cured within 30 minutes. The thickest laminate was the longest to cure due to the extra time to fully warm the laminate stack to reach the reaction onset temperature. As predicted, no intermediate dwell was required to control the exotherm within an acceptable heat rise. In this example it would be possible to achieve a complete cure of the same component as was used in Comparative Example 3 in 2 hours 30 min vs. the 9 hour 40 min cycle in Comparative Example 3. The cool down step would also be faster as the laminate reached a lower peak exotherm.

The prepreg was highly suitable for manufacturing composite parts.

Figure 4:
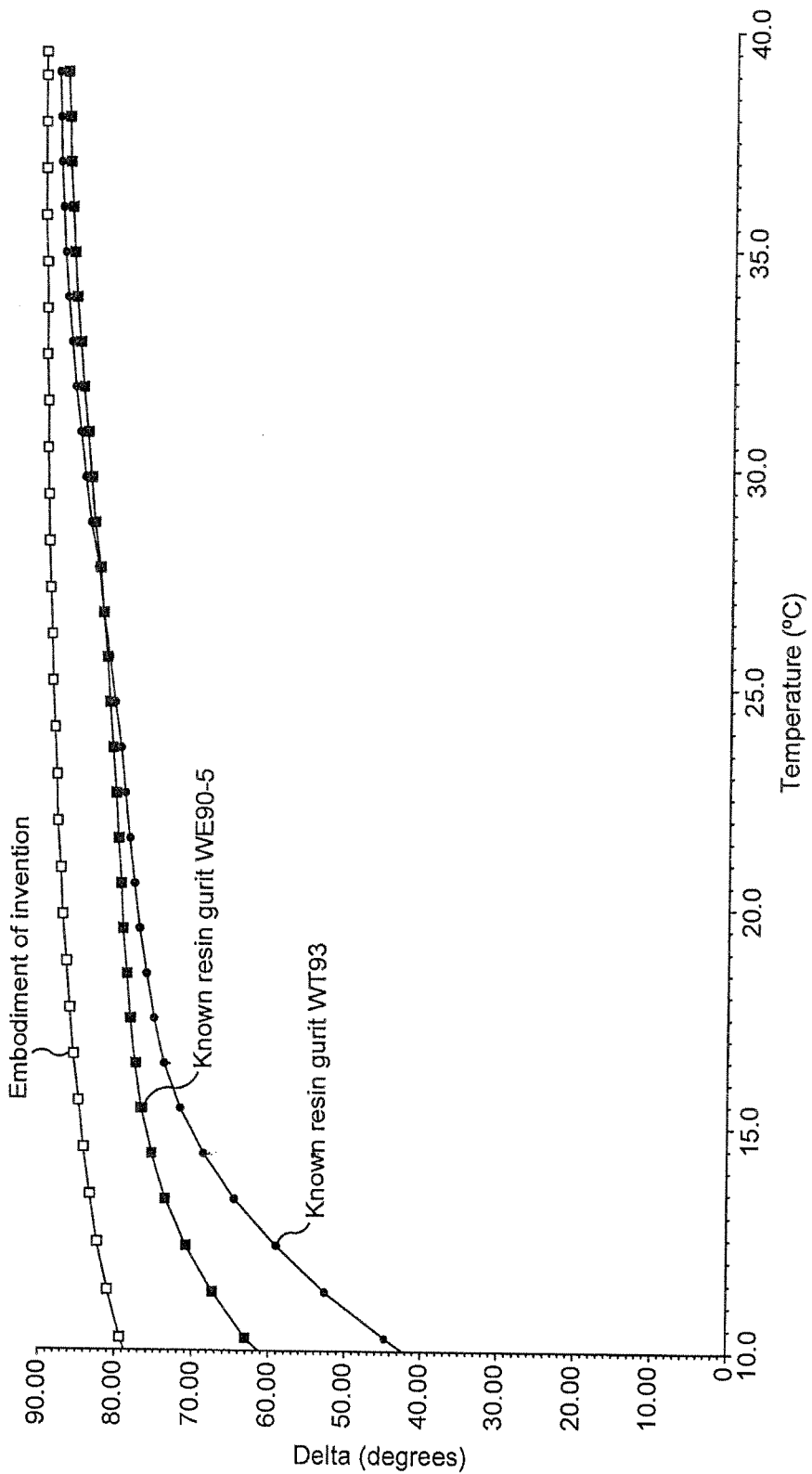
FIG. 4 shows the relationship between the phase angle delta and temperature of a prepreg according to an embodiment of the present invention and two known prepreg resins.

Comparing drape against typical prepregs (Gurit WE90-5 (a commercially available difunctional DEGBA epoxy prepreg having high drape and tack) and Gurit WT93 (a commercially available difunctional DEGBA epoxy prepreg having low drape and tack) both commercially available from Gurit (UK) Limited) from FIG. 4 it can be see that for the prepreg of the invention the phase angle delta is significantly higher than these prepregs and close to 90° over a wide temperature range, and in particular within the typical workshop temperature range of from 15 to 30° C. This makes the prepreg of the invention easy to shape to the desired geometry and reduces the tendency for it to have an elastic memory to spring back to its original position during lamination steps.

Figure 5:
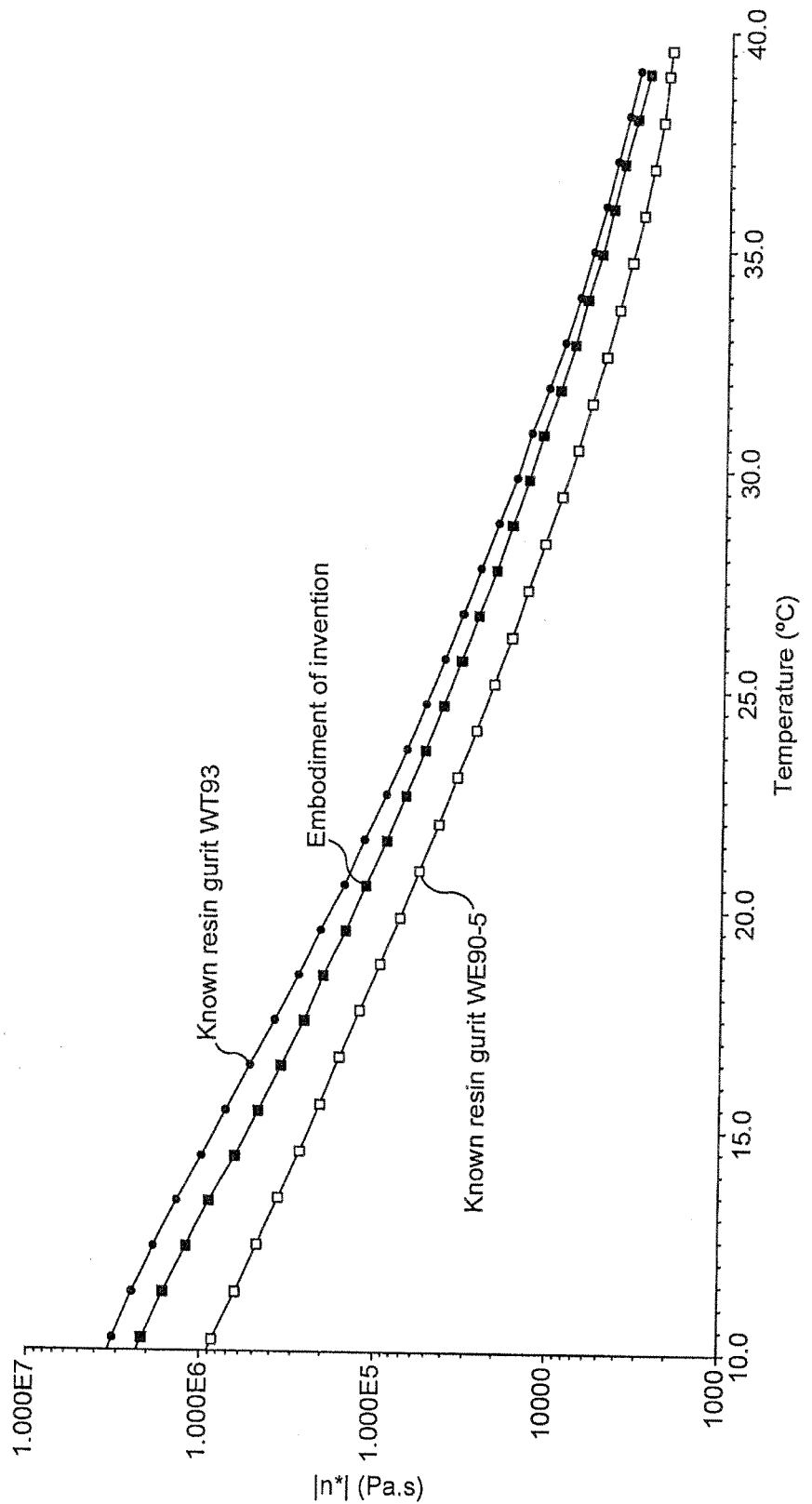
FIG. 5 shows the relationship between the complex viscosity and temperature of a prepreg according to an embodiment of the present invention and two known prepreg resins.

FIG. 5 shows that the complex viscosity of the resin of the invention is substantially the same at that of the two known resins across a typical working temperature range. The resin material of the invention is highly drapable.

Unusually for such a highly drapable material, the tack levels were low at QC-2 making the prepreg easy to laminate and have sufficient track to adhere multiple plies of the material to vertical and under-hanging mould surfaces.

Figure 6:
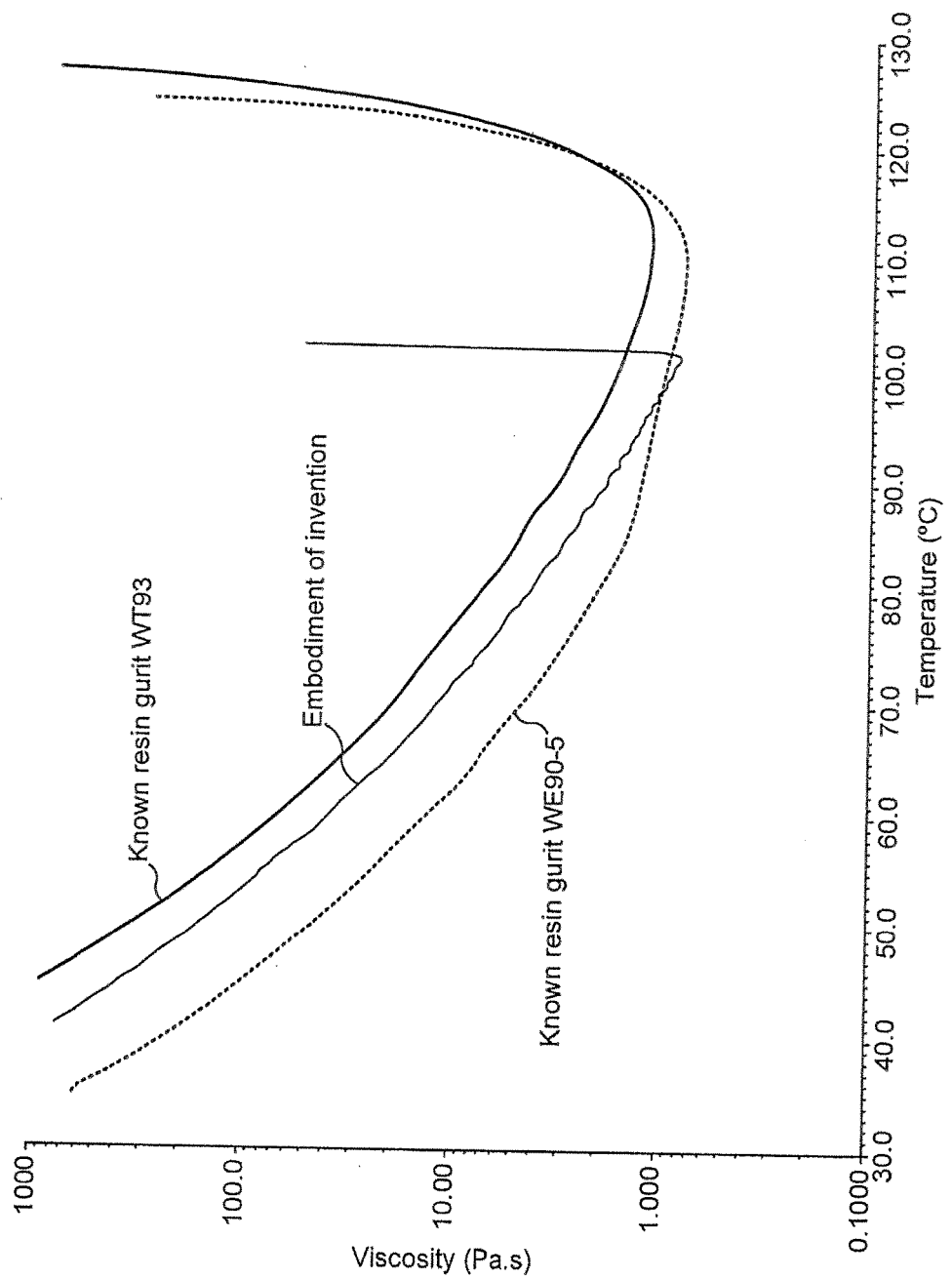
FIG. 6 shows the relationship between the viscosity and temperature of a prepreg according to an embodiment of the present invention and two known prepreg resins.

FIG. 6 compares the viscosity during processing against Gurit WE90-5 (a commercially available difunctional DEGBA epoxy prepreg with high flow and drape) and Gurit WE93 (a commercially available difunctional DEGBA epoxy prepreg with low flow resin) to demonstrate similar viscosities and processing behaviour to give high quality laminates.

Mechanical properties of the resin were evaluated by preparing an air free resin cast and curing for 30 minutes at 120° C. A 35% glass fibre prepreg was made by first casting a film of resin onto silicone paper and using this resin film to impregnate a stitched 800 gsm E-glass fibre unidirectional fabric (available in commerce from Gurit (UK) Limited as Gurit UTE800). Plies of this prepreg were prepared and cured at 120° C. for 30 minutes using vacuum only consolidation to give a full resin cure.

The Tg of the cured material (resin & laminate) was evaluated by DMA to be 115° C.

Linear resin shrinkage was calculated from the volumetric change measured by the change in density of the uncured and cured resin and was 1.7%.

As the resin of this invention was only contacted to the fabric the ability of the resin to impregnate the dry fibre during the processing step was assessed. The cured laminate quality was of excellent quality having less than 2% voids confirming the suitability of the resin for resin film infusion processing methods, such as those used in the material described in as described in EP-B-1128958

Example 2

A resin film of the same resin used in Example 1 was cast onto silicone paper and contacted to Gurit YE1200/TEA50 fabric, a 1250 gsm E-glass stitched triaxial fabric containing 400 gsm 0° fibre/400 gsm+45° fibre/400 gsm−45° fibre/50 gsm Glass fleece tissue) to make a glass triaxial prepreg with 44 wt % resin. A number of resin plies were laid up as a stack and cured as described above for Example 1.

Comparative Examples 4 and 5

The mechanical properties of the prepregs produced according to Examples 1 and 2 were compared against prepregs made using current known epoxy prepreg resins.

The same method as described in the third to last paragraph of Example 1 was used to prepare a similar resin cast of a known difunctional DEGBA epoxy prepreg resin from Gurit (UK) Limited, available in commerce as WE91-1. The same method was used to make a prepreg using the same 800 gsm E-glass fibre unidirectional fabric (available in commerce from Gurit (UK) Limited as Gurit UTE800) and Gurit WE91-1 epoxy resin. Plies of this prepreg were prepared and cured at 120° C. for 60 minutes using vacuum only consolidation to give a full resin cure. This provided a prepreg according to Comparative Example 4.

A resin film of a DEGBA epoxy resin prepreg available in commerce from Gurit (UK) Limited as WE92 was also similarly cast onto silicone paper and contacted to Gurit YE1200/TEA50 fabric, a 1250 gsm E-glass stitched triaxial fabric containing 400 gsm 0° fibre/400 gsm+45° fibre/400 gsm−45° fibre/50 gsm glass fleece tissue as used in Example 2 to make a glass triaxial prepreg with 44 wt % resin. This provided a prepreg according to Comparative Example 5.

The same number of plies of the WE92 prepreg as for Example 2 were cured together at 120° C. for 150 min to ensure the full cure of the slower curing WE92 prepreg using a vacuum only consolidation method.

The mechanical properties for the cured composite laminates produced in Examples 1 and 2 and Comparative Examples 4 and 5 are shown in Tables 6 and 7.

Example 3

A prepreg resin was manufactured from epoxy resin containing 2 unsaturated methacrylic groups.

The resin was manufactured by, in a first reaction step, reacting for a period of 2 hours at a temperature of 100° C. 1 mole of hydroxy ethyl methacrylate (HEMA) with 1 mole part of phthalic anhydride to produce HEMA acid phthalate.

Then, in a second reaction step, 2 moles of HEMA acid phthalate was reacted with 1 mole of a bisphenol A epoxy resin having a molecular weight of about 354 (available in commerce under the trade name DER330) for a period of 8 hours at a temperature of 100° C. This provided the unsaturated monomer of the prepreg resin.

Subsequently, a photoinitiator curing agent to act as a polymerisation catalyst for the unsaturated monomer was incorporated into the reaction product by dispersing 1 wt % of a commercially available curing agent, available in commerce as Irgacure 819, at a temperature of 100° C. into the resin.

The resin was cast into a film and then the resin cast was exposed to UV light for a period of 5 minutes at a location 475 mm below the surface of an 800 w UV undoped mercury Flood lamp, Serial Number 574 from UV Light Technology. Tensile coupons were tested according to ASTM D638-90

A 35% glass fibre prepreg was made by first casting a film of resin onto silicone paper and using this resin film to impregnate Gurit UTE800, a 800 gsm E-glass stitched fibre unidirectional fabric.

Samples were exposed to UV light for a period of 5 minutes at a location 475 mm below the surface of a 800 W UV undoped mercury Flood lamp, Serial Number 574 from UV Light Technology to obtain the mechanical properties of the laminate.

The glass transition temperature and some mechanical properties of laminates produced using the resin of Examples 1, 2 and 3 and, for comparison, using a known prepreg resin from Gurit, available in commerce as WE91-1 and WE92, as in Comparative Examples 4 and 5, were measured and the results are shown in Tables 5, 6, and 7. Table 5 shows the resin properties, Table 6 the properties of the UTE800 unidirectional stitched E-glass prepreg (having a 53 and Table 7 the properties of the E-glass triaxial prepreg.

TABLE 5

| Resin Example | Tensile Modulus - GPa ASTM D638-90 | Heat of polymerisation (Delta H) - KJ/Kg | Tensile Strength -MPa ASTM D638-90 | Elongation at Break ASTM D638-90 | Tg1 (C.) by DMA |
|---|---|---|---|---|---|
| Gurit WE91-1 | 3.3 | 270 | 86 | 5.0 | 110-120 |
| Examples 1 and 2 2HPE resin Peroxide Cured | 4.2 | 113 | 98 | 5.4% | 115 |
| Example 3 2HPE resion UV Cured | 4.5 | N/A ** | 77 | 2.3% | 90-94 |

** Photo-initiated material shows no polymerisation by thermal DSC.

TABLE 6

| Material | Tg1 by DMA/ ° C. | Inter-laminar shear strength (ILSS)/MPa | Tensile Strength (53% volume fraction (vf))/MPa | Tensile Modulus (53% vf)/GPa |
|---|---|---|---|---|
| Comparative Example 4 WE91-1/UTE800 Prepreg | 105 | 63 | 944 | 41 |
| Example 1—2HPE resin UTE800 Prepreg Peroxide Cured | 115 | 55 | 960 | 44 |
| Example 3—2HPE resin UTE800 Prepreg UV Cured | 94 | 79 | 1197 | 48 |

TABLE 7

| Material | Inter-laminar shear strength (ILSS)/MPa | Compressive Modulus (42% vf)/GPa | Compressive Strength (42% volume fraction (vf))/MPa | Tensile Modulus (42% vf)/GPa |
|---|---|---|---|---|
| Comparative Example 5 WE92/YE1200/TEA50 | 40.1 | 22.0 | 412.3 | 22.0 |
| Example 2 - 2HPE resin YE1200/TEA50 Prepreg Peroxide Cured | 50.2 | 26.4 | 505.9 | 24.1 |

It can be seen that the prepregs made from the resins produced in accordance with the examples of the present invention have on average higher mechanical properties than the comparative known epoxy prepreg materials.

Example 4

A resin with a similar texture and enthalpy of cure to Example 1 was obtained by the following preparation process.

The resin was manufactured by, in a first reaction step, reacting for a period of 8 hours at a temperature of 100° C. 50 parts by weight of DER330 with methacrylic acid (mole ratio 1:2) and 50 parts by weight of Epikote 1001 with methacrylic acid (mole ratio 1:2). This provided the unsaturated monomer of the prepreg resin.

Subsequently, a t-butyl perbenzoate peroxide curing agent to act as a polymerisation catalyst for the unsaturated monomer was incorporated into the reaction product by dispersing 1 wt % of commercially available curing agent Lupernox P at a temperature of 80° C. into the resin.

This produced a prepreg resin with a tack rating of QC1 and an enthalpy of reaction measured at 118 KJ/Kg. A resin sample was cured for a period of 1 hour at 120° C. to give a Tg by DMA of 88° C.

Example 5

A resin with a similar texture and enthalpy of cure to Example 4, but having a higher tack than the resin of Example 4, was obtained by the following production process.

The resin was manufactured by, in a first reaction step, reacting for a period of 8 hours at a temperature of 100° C. 60 parts by weight of DER330 with methacrylic acid (mole ratio 1:2) and 40 parts by weight Epikote 1001 with methacrylic acid (mole ratio 1:2). This provided the unsaturated monomer of the prepreg resin.

Subsequently, a t-butyl perbenzoate peroxide curing agent to act as a polymerisation catalyst for the unsaturated monomer was incorporated into the reaction product by dispersing 1 wt % of a commercially available curing agent, available in commerce as Lupernox P, at a temperature of 80° C. into the resin.

This produced a prepreg resin with a tack rating of QC2 and an enthalpy of reaction measured at 119 KJ/Kg. A resin sample was cured for a period of 1 hour at 120° C. to give a Tg by DMA of 87° C.

Example 6

This example produced a maleic anhydride HEMA resin having a high QC-10 tack, and may be compared to Example 1 producing a phthalic anhydride HEMA resin having low QC-2 tack.

The resin was manufactured by, in a first reaction step, reacting for a period of 2 hours at a temperature of 100° C. 1 mole of hydroxy ethyl methacrylate (HEMA) with 1 mole of maleic anhydride to produce HEMA acid maleate.

Then, in a second reaction step, 2 moles of HEMA acid maleate were reacted with 1 mole of an epoxy resin available in commerce under the trade name DER330 for a period of 8 hours at a temperature of 100° C. This provided the unsaturated monomer of the prepreg resin.

Subsequently, a peroxide curing agent to act as a polymerisation catalyst for the unsaturated monomer was incorporated into the reaction product by dispersing 1 wt % of a commercially available tert-butyl peroxybenzoate curing agent, available in commerce as Lupernox P, at a temperature of 80° C. into the resin.

This produced a prepreg resin with a tack rating of QC10 and an enthalpy of reaction measured at 188 KJ/Kg. A resin sample was cured for a period of 1 hour at 120° C. to give a Tg by DMA of 112° C.

The invention claimed is:

1. A prepreg comprising:
a fibrous material at least partially impregnated with a polymerisable resin,
wherein the polymerisable resin is partially cured and at least 50 wt % of the polymerisable resin comprises at least one polymerisable monomer having at least two carbon-carbon unsaturated functional groups, the monomer being polymerisable by radical curing of the unsaturated functional groups to form a cured resin matrix containing the fibrous material,
the resin has up to 4.2 gram equivalents of unsaturation per kilogram of resin, and
wherein the resin has a heat of polymerization of less than 175 KJ/kg to provide a maximum increase in temperature of the prepreg of 40° C. during polymerisation under adiabatic conditions.

2. A prepreg according to claim 1 wherein the reaction includes a free radical reaction.

3. A prepreg according to claim 1 wherein the heat of polymerization is less than 155 KJ/kg.

4. A prepreg according to claim 1 wherein the polymerisable monomer has an average molecular weight of from 650 to 1250.

5. A prepreg according to claim 1 wherein the monomer has the structure $R1_n$-$R2$-$R1'_m$, wherein R1 and R1' are the same or different and each includes a carbon-carbon unsaturation, n and m are each at least one and may be the same or different and R2 is polyfunctional and comprises a moiety having aliphatic, araliphatic, cycloaliphatic, heterocyclic and/or aromatic groups.

6. A prepreg according to claim 5 wherein R2 includes a bisphenol residue or a polyol or a polyester.

7. A prepreg according to claim 6 wherein R2 includes a group of formula:

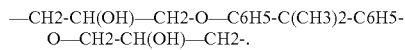
—CH2-CH(OH)—CH2-O—C6H5-C(CH3)2-C6H5-O—CH2-CH(OH)—CH2-.

8. A prepreg according to claim 7 wherein R2 is derived from an epoxy resin.

9. A prepreg according to claim 6 wherein R2 includes a group of formula:

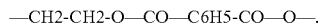
—CH2-CH2-O—CO—C6H5-CO—O—.

10. A prepreg according to claim 9 wherein R2 is derived from a phthalate.

11. A prepreg according to claim 6 wherein R2 has a molecular weight of from 60 to 1000.

12. A prepreg according to claim 6 wherein R2 has a molecular weight of from 300 to 500.

13. A prepreg according to claim 6 wherein R2 has a molecular weight of from 350 to 400.

14. A prepreg according to claim 6 wherein R2 has a molecular weight of about 370.

15. A prepreg according to claim 5 wherein R2 includes a group of formula: —[CH2-CH(OH)—CH2-O—(O)C]xR wherein R is a polyfunctional acid having a functionality of x.

16. A prepreg according to claim 15 wherein R2 is derived from a glycidyl ester.

17. A prepreg according to claim 5 wherein R1 and R1' each include a methacrylate group, an acrylate group or a maleate group.

18. A prepreg according to claim 5 wherein R2 includes a bisphenol A residue.

19. A prepreg according to claim 1 wherein the at least one monomer comprises first and second comonomers, whereby the comonomers copolymerise to form a copolymer therebetween in the cured resin matrix.

20. A prepreg according to claim 19 wherein a first comonomer comprises a maleate group as the unsaturation and a second comonomer comprises an acrylate or methacrylate group as the unsaturation.

21. A prepreg according to claim 1 wherein the at least one monomer is produced by reacting an unsaturated epoxy ester with an acid, a phenol or an amine.

22. A prepreg according to claim 21 wherein the at least one monomer is produced by reacting glycidyl methacrylate with an acid, a phenol or an amine.

23. A prepreg according to claim 21 wherein the at least one monomer is produced by reacting an unsaturated epoxy ester with a diacid.

24. A prepreg according to claim 23 wherein the diacid is sebacic acid.

25. A prepreg according to claim 21 wherein the at least one monomer is produced by reacting an unsaturated epoxy ester with a primary or disecondary amine.

26. A prepreg according to claim 1 wherein the fibrous material comprises from 55 to 70 wt % of the prepreg and the polymerisable resin comprises from 30 to 45 wt % of the prepreg.

27. A prepreg according to claim 1 wherein the fibrous material comprises at least one of carbon, aramid, glass, or natural fibres.

28. A prepreg according to claim 1 wherein the polymerisable resin further comprises a radical curing agent for the polymerization.

29. A prepreg according to claim 28 wherein the curing agent comprises at least one of a photoinitiator and a peroxide initiator.

30. A prepreg according to claim 1 wherein the resin has up to 3.2 gram equivalents of unsaturation per kilogram of resin.

31. A prepreg according to claim 1 wherein the resin has less than 2.8 gram equivalents of unsaturation per kilogram of resin.

32. A prepreg according to claim 1 wherein the resin has less than 2.2, gram equivalents of unsaturation per kilogram of resin.

33. A prepreg according to claim 1 wherein the polymerisable monomer has an average molecular weight of from 850 to 1050.

* * * * *